(12) United States Patent
Ogura et al.

(10) Patent No.: US 11,381,998 B2
(45) Date of Patent: Jul. 5, 2022

(54) COMMUNICATION APPARATUS, METHOD, PROGRAM, AND RECORDING MEDIUM

(71) Applicant: NEC CORPORATION, Tokyo (JP)

(72) Inventors: Daisuke Ogura, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 270 days.

(21) Appl. No.: 16/488,345

(22) PCT Filed: Jan. 31, 2018

(86) PCT No.: PCT/JP2018/003226
§ 371 (c)(1),
(2) Date: Aug. 23, 2019

(87) PCT Pub. No.: WO2018/159204
PCT Pub. Date: Sep. 7, 2018

(65) Prior Publication Data
US 2021/0289394 A1 Sep. 16, 2021

(30) Foreign Application Priority Data
Feb. 28, 2017 (JP) .............................. JP2017-037265

(51) Int. Cl.
*H04W 28/06* (2009.01)
*H04W 76/11* (2018.01)
(Continued)

(52) U.S. Cl.
CPC ............. *H04W 28/06* (2013.01); *H04L 69/22* (2013.01); *H04W 76/11* (2018.02); *H04W 80/06* (2013.01); *H04W 92/045* (2013.01)

(58) Field of Classification Search
CPC ..... H04W 28/06; H04W 76/11; H04W 80/06; H04W 92/045; H04W 92/14;
(Continued)

(56) References Cited

U.S. PATENT DOCUMENTS 6,621,895 B1 * 9/2003 Giese ...................... H04M 3/22
370/465
6,694,471 B1 * 2/2004 Sharp .................... H04L 1/1874
709/224
(Continued)

FOREIGN PATENT DOCUMENTS

JP  2005-167458 A  6/2005
JP  2008-011536 A  1/2008
(Continued)

OTHER PUBLICATIONS

Written Opinion dated Apr. 17, 2018, from the International Searching Authority in International Application No. PCT/JP2018/003226.
(Continued)

*Primary Examiner* — Nimesh Patel

(57) ABSTRACT

In order to enable, even when there exist a plurality of apparatuses configured to perform processing of an upper layer of the transport layer for one apparatus configured to perform processing of the transport layer or a lower layer, reliable communication with each of the apparatuses configured to perform the processing of the upper layer, via the transport layer, an apparatus includes a generating section 141 configured to generate a transport layer packet including identification information in a packet region different from a service data unit, the identification information being used in an upper layer of a transport layer, and a transmission processing section 143 configured to transmit the transport layer packet.

13 Claims, 15 Drawing Sheets

(51) Int. Cl.
*H04L 69/22* (2022.01)
*H04W 80/06* (2009.01)
*H04W 92/04* (2009.01)

(58) Field of Classification Search
CPC .............. H04W 28/085; H04W 28/04; H04W 28/16; H04W 28/02; H04W 28/0268; H04W 28/0804; H04W 28/0808; H04W 28/10; H04W 28/0933; H04W 28/0842; H04W 92/04; H04W 84/042; H04W 72/04; H04W 72/10; H04W 40/00; H04W 48/17; H04W 48/02; H04W 8/205; H04W 80/00; H04W 28/0236; H04W 36/12; H04W 36/24; H04W 76/00; H04W 8/24; H04W 64/003; H04W 72/1257; H04W 8/08; H04W 80/08; H04W 84/005; H04W 88/14; H04W 76/15; H04W 24/02; H04W 88/085; H04W 60/00; H04W 76/12; H04W 80/02; H04W 92/12; H04W 60/04; H04W 12/06; H04W 76/28; H04W 8/186; H04W 72/0426; H04W 72/14; H04W 76/19; H04W 76/50; H04W 88/08; H04W 88/16; H04L 69/22; H04L 69/16; H04L 69/326; H04L 43/08; H04L 65/608; H04L 29/06; H04L 69/163; H04L 45/38; H04L 47/2483; H04L 47/2416; H04L 2209/80; H04L 43/026; H04L 47/10; H04L 5/0055; H04L 5/0048; H04L 5/0044; H04L 45/24; H04L 5/0007; H04L 1/1812; H04L 1/1822; H04L 1/1864; H04L 25/0254; H04B 17/309; H04B 7/088; H04B 7/0695; H04B 7/2606; H04B 17/318; H04B 7/0413; H04B 7/0617; H04B 7/0404; H04B 7/15528; H04B 7/0408; H04B 7/0626; H04B 7/063; H04B 7/0639; H04B 7/086; H04M 2207/18; H04M 3/51; H04M 3/5116; H04M 7/006; H04M 7/0096; H04M 2242/04; G06Q 20/3221; G06Q 20/3674; G06Q 20/3223; G06Q 40/02; G06Q 20/10
USPC ............................. 370/329, 310.2; 455/450.1
See application file for complete search history.

(56) References Cited

U.S. PATENT DOCUMENTS

| | | | | |
|---|---|---|---|---|
| 7,433,368 B2* | 10/2008 | Feith | ............... | H04Q 3/0025 370/466 |
| 10,097,992 B2* | 10/2018 | Sivavakeesar | ........ | H04W 48/16 |
| 2004/0151111 A1* | 8/2004 | Yarroll | ............... | H04L 69/161 370/216 |
| 2007/0025342 A1 | 2/2007 | Obata | | |
| 2008/0096562 A1* | 4/2008 | Wu | ............... | H04L 69/163 455/436 |
| 2008/0137568 A1* | 6/2008 | Ho | ............... | H04L 69/326 370/310 |
| 2008/0192740 A1* | 8/2008 | Lorusso | ............... | H04L 12/4633 370/389 |
| 2008/0311855 A1* | 12/2008 | Manousakis | .......... | H04W 28/06 455/67.11 |
| 2009/0207855 A1 | 8/2009 | Watanabe | | |
| 2010/0142407 A1 | 6/2010 | Serravalle | | |
| 2010/0165897 A1* | 7/2010 | Sood | ............... | G06F 1/3293 370/311 |
| 2010/0260090 A1* | 10/2010 | Santhanam | ......... | H04W 72/042 370/312 |
| 2010/0268838 A1* | 10/2010 | Hong | ............... | H04L 65/4069 709/231 |
| 2012/0033556 A1* | 2/2012 | Kruglick | ............. | H04L 41/0631 370/241 |
| 2012/0185917 A1* | 7/2012 | Baum | ............... | H04L 69/324 726/3 |
| 2012/0233311 A1* | 9/2012 | Parker | ............... | H04L 63/1425 709/224 |
| 2012/0297473 A1 | 11/2012 | Case et al. | | |
| 2014/0317738 A1* | 10/2014 | Be'ery | ............... | H04L 63/14 726/23 |
| 2017/0026405 A1* | 1/2017 | Vengalil | ............... | H04L 63/1458 |
| 2017/0163373 A1* | 6/2017 | Hwang | ............... | H04L 1/0002 |
| 2017/0251026 A1* | 8/2017 | Straub | ............... | H04L 67/2842 |
| 2018/0103018 A1* | 4/2018 | Chauhan | ............... | F15B 19/005 |
| 2018/0316690 A1* | 11/2018 | Cho | ............... | H04W 12/106 |
| 2018/0367620 A1* | 12/2018 | Li | ............... | H04L 69/327 |
| 2019/0149538 A1* | 5/2019 | Friel | ............... | H04L 63/0281 726/6 |
| 2019/0208555 A1* | 7/2019 | Zee | ............... | H04W 92/045 |
| 2019/0208563 A1* | 7/2019 | Zee | ............... | H04W 76/38 |
| 2020/0367137 A1* | 11/2020 | Yang | ............... | H04B 7/155 |
| 2021/0015582 A1* | 1/2021 | Kamata | ............... | A61B 90/50 |

FOREIGN PATENT DOCUMENTS

| | | | |
|---|---|---|---|
| JP | 2009-200689 | A | 9/2009 |
| JP | 2012-195966 | A | 10/2012 |
| JP | 2013-502859 | A | 1/2013 |
| JP | 2015-149739 | A | 8/2015 |

OTHER PUBLICATIONS

Samsung, "NG interface considerations", 3GPP TSG-RAN WG3#93bis, R3-162132, Oct. 10-14, 2016, pp. 1-4, Sophia Antipolis, France.
International Search Report of PCT/JP2018/003226 dated Apr. 17, 2018 [PCT/ISA/210].

* cited by examiner

| Variable Parameters | Status | Type Value |
|---|---|---|
| IPv4 Address | Optional | 5 |
| IPv6 Address | Optional | 6 |
| Cookie Preservative | Optional | 9 |
| Reserved for ECN Capable | Optional | 32768 |
| Host Name Address | Optional | 11 |
| Supported Address Types | Optional | 12 |
| AP-ID | Optional | |

Fig. 10

COMMUNICATION APPARATUS, METHOD, PROGRAM, AND RECORDING MEDIUM

CROSS REFERENCE TO RELATED APPLICATIONS

This application is a National Stage of International Application No. PCT/JP2018/003226, filed Jan. 31, 2018, claiming priority based on Japanese Patent Application No. 2017-037265, filed Feb. 28, 2017, the contents of all of which are incorporated herein by reference in their entirety.

BACKGROUND

Technical Field

The present invention relates to a communication apparatus, a method, a program, and a recording medium that relate to data transmission and/or reception via a radio access network.

Background Art

Third-generation (3G) and fourth-generation (4G) mobile communication systems use the Stream Control Transmission Protocol (SCTP) as a transport protocol for S1-AP or X2-AP data transmission and/or reception between an eNB and an MME or an adjacent eNB.

The SCTP is used for a connection using, as key information, an IP address determined in advance with an MME or an adjacent eNB and involves no awareness of the configuration of an application protocol (AP), which is an upper layer protocol. Hence, establishment of SCTP association and stream selection for the SCTP association are performed mainly by the AP.

For example, Patent Literature 1 discloses that a payload protocol identifier (PPI, association protocol indicator) of a single association is enabled to support a plurality of different upper protocol users by using characteristics that SCTP association is not related to an upper layer protocol.

CITATION LIST

Patent Literature

[PTL 1] JP 2013-502859 T

SUMMARY

Technical Problem

However, in a case where a core network is distributed through network function virtualization or the like, for example, the following problem occurs.

First, there may exist a plurality of upper layer processing apparatuses that perform processing of an upper layer (e.g., an application layer), for one lower layer processing apparatus that performs processing of the transport layer or a lower layer. This, for example, causes a problem of how a wireless communication network node, such as a base station, transmits information to an upper layer processing apparatus by using the transport layer or the lower layer.

An example object of the present invention is to provide a communication apparatus, a method, a program, and a recording medium that enable, even when there exist a plurality of apparatuses configured to perform processing of an upper layer of a transport layer for one apparatus configured to perform processing of the transport layer or a lower layer, communication with each of the apparatuses configured to perform the processing of the upper layer via the transport layer.

Solution to Problem

A communication apparatus of the present invention includes: a generating section configured to generate a transport layer packet including identification information in a packet region different from a service data unit, the identification information being used in an upper layer of a transport layer; and a transmission processing section configured to transmit the transport layer packet.

A method of the present invention includes: generating a transport layer packet including identification information in a packet region different from a service data unit, the identification information being used in an upper layer of a transport layer; and transmitting the transport layer packet.

A program of the present invention is a program causing a processor to: generate a transport layer packet including identification information in a packet region different from a service data unit, the identification information being used in an upper layer of a transport layer; and transmit the transport layer packet.

A recording medium of the present invention is a non-transitory computer-readable recording medium having recorded thereon a program causing a processor to: generate a transport layer packet including identification information in a packet region different from a service data unit, the identification information being used in an upper layer of a transport layer; and transmit the transport layer packet.

Advantageous Effects of Invention

According to the present invention, it is possible to, even when there exist a plurality of apparatuses configured to perform processing of an upper layer of a transport layer for one apparatus configured to perform processing of the transport layer or a lower layer, communicate with each of the apparatuses configured to perform the processing of the upper layer, via the transport layer. Note that, according to the present invention, instead of or together with the above effects, other effects may be exerted.

BRIEF DESCRIPTION OF THE DRAWINGS

FIG. 10 is a diagram illustrating an example of types of optional parameters for defining the regions AP-ID for the identification information in the region for variable-length parameters;

DESCRIPTION OF THE EXAMPLE EMBODIMENTS

Hereinafter, example embodiments of the present invention will be described in detail with reference to the accompanying drawings. Note that, in the Specification and drawings, elements to which the similar descriptions are applicable are denoted by the same reference signs, and overlapping descriptions may hence be omitted.

Descriptions will be given in the following order.
1. Related Art
2. Overview of Example Embodiments of the Present Invention
3. Configuration of System
4. First Example Embodiment
4.1. Configuration of Base Station
4.2. Configuration of IP/SCTP Processing Apparatuses
4.3. Technical Features
5. Second Example Embodiment
5.1. Configuration of IP/SCTP Processing Apparatuses
5.2. Configuration of DUs
5.3. Technical Features
6. Third Example Embodiment
6.1. Configuration of Communication Apparatus
6.2. Technical Features
7. Other Example Embodiments 1. Related Art A description will be given of a protocol for a mobile communication system under study in 5G and the like, for example, as a technique related to example embodiments of the present invention.

Recently, in 3GPP standardization, the use of the SCTP is being studied as an interface between a base station (generation Node B: gNB) and a new generation (NG) core network for 5G, as in the case of 3G/LTE.

Moreover, in 5G, virtualization of core network and wireless communication network functions is being studied, for example. Hence, for example, a function for performing processing of the transport layer and a function for performing processing of an upper layer of the transport layer may be distributed to a plurality of communication apparatuses in a core network and a wireless communication network.

From an example aspect of service continuity and the like, a base station (gNB) needs to identify a communication apparatus that is to perform processing of the transport layer on the core network side and establish SCTP association with the identified communication apparatus.

Figure 1:
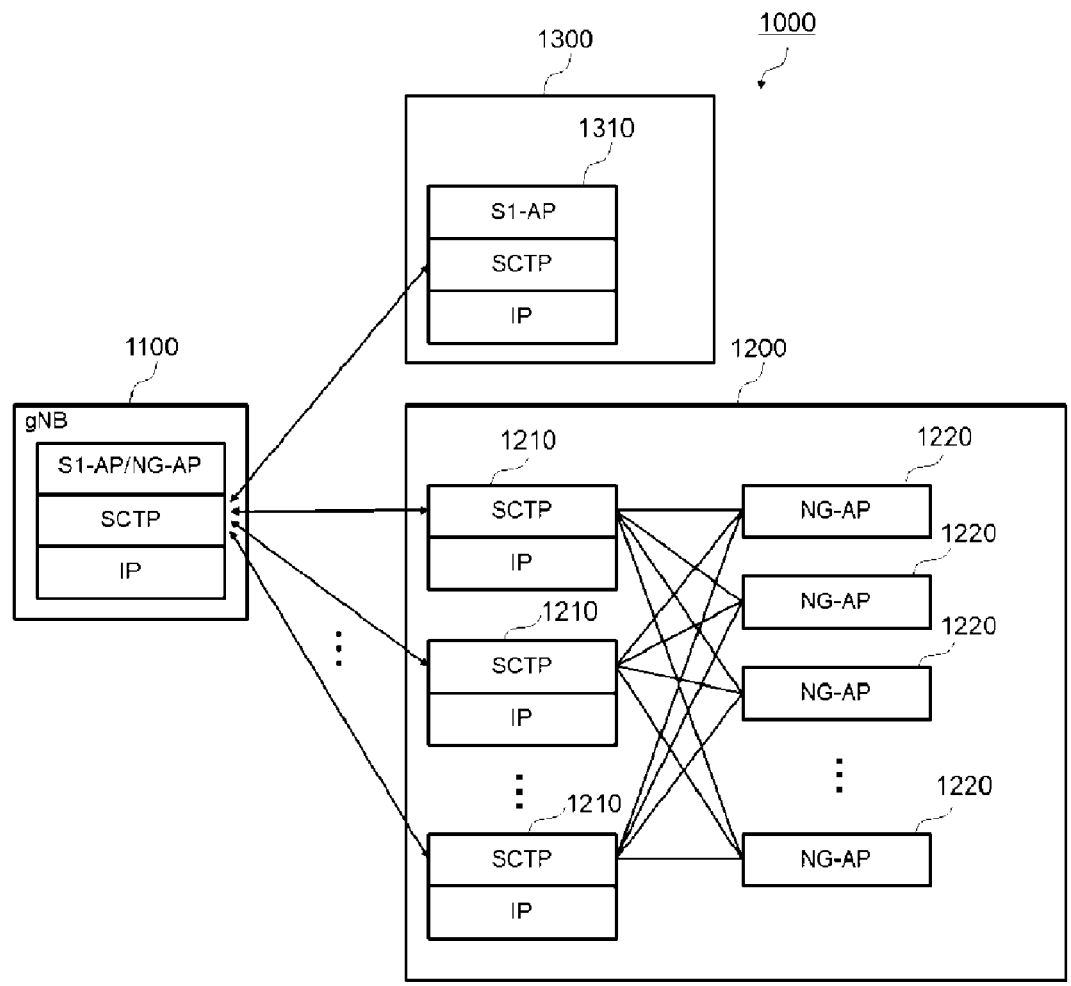
FIG. 1 is a diagram illustrating a schematic configuration of a system 1000 including a 5G network configuration and a 3G/4G network configuration.

FIG. 1 is a diagram illustrating a schematic configuration of a system 1000 including a 5G network configuration and a 3G/4G network configuration.

For example, the system 1000 includes a gNB 1100 in 5G, an NG core network 1200 in 5G, and a core network 1300 in 3G/4G.

The NG core network 1200 includes a plurality of IP/SCTP processing apparatuses 1210 configured to perform IP/SCTP processing and a plurality of NG-AP processing apparatuses 1220 configured to perform upper layer (NG-AP) processing, through virtualization, for example. Look at one IP/SCTP processing apparatus 1210. The IP/SCTP processing apparatus 1210 communicates with an unspecified number of NG-AP processing apparatuses 1220.

For this reason, SCTP association between the gNB 1100 and the IP/SCTP processing apparatus 1210 needs to be established for each of the AP processing apparatuses 1220 that are to transmit and/or receive data to and/or from the IP/SCTP processing apparatus 1210.

Meanwhile, the core network 1300 in 3G/4G includes a mobility management entity (MME) 1310. The MME 1310 performs processing of each of Internet protocol (IP)/stream control transmission protocol (SCTP)/S1-application protocol (AP). Hence, the gNB 1100 can establish SCTP association with the MME 1310 for data transmission and/or reception without being aware of S1-AP.

Figure 2:
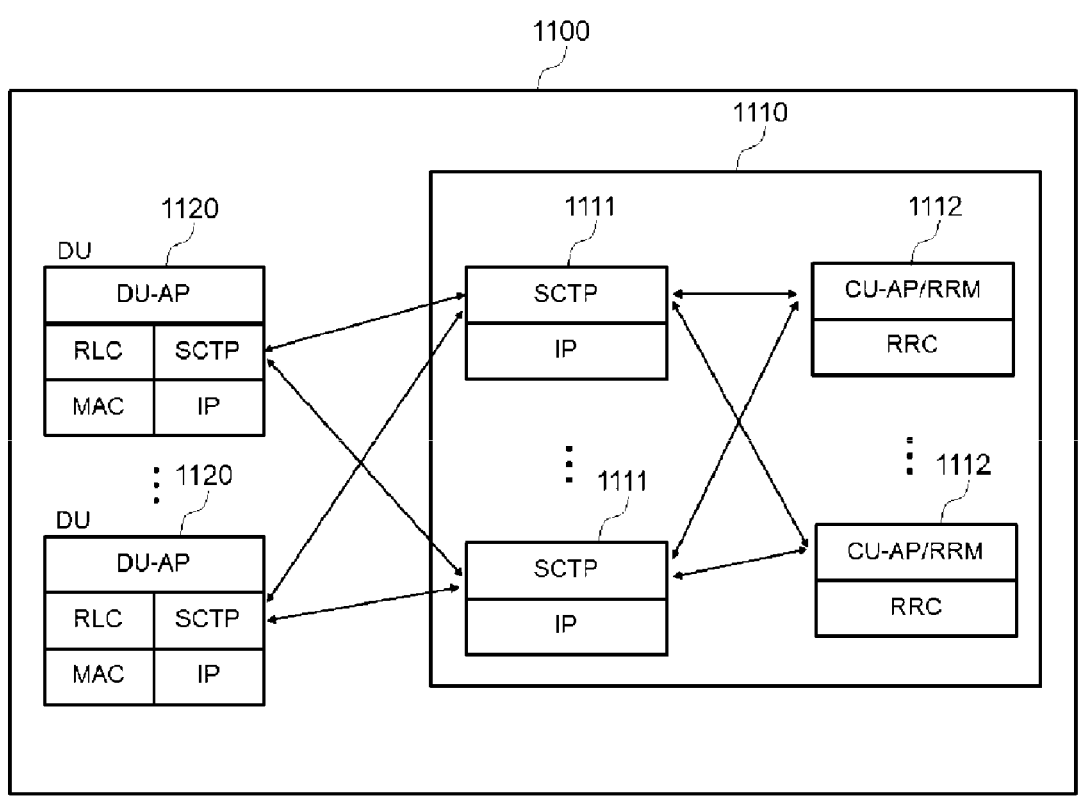
FIG. 2 is a diagram illustrating a schematic configuration of a gNB 1100 separated into a central unit (CU) 1110 configured to perform data processing in a centralized manner and a plurality of distributed units (DUs) 1120 configured to perform radio processing in a distributed manner.

FIG. 2 is a diagram illustrating a schematic configuration of the gNB 1100 separated into a central unit (CU) 1110 configured to perform data processing in a centralized manner and a plurality of distributed units (DUs) 1120 configured to perform radio processing in a distributed manner.

The CU 1110 includes a plurality of IP/SCTP processing apparatuses 1111 configured to perform IP/SCTP processing and a plurality of AP processing apparatuses 1112 configured to perform processing of CU-AP/radio resource management (RRM), which is an upper layer configured to manage radio resource control (RRC) and the like, through virtualization, for example. Look at one IP/SCTP processing apparatus 1111. The IP/SCTP processing apparatus 1111 communicates with an unspecified number of AP processing apparatuses 1112.

For this reason, SCTP association between the DU 1120 and the IP/SCTP processing apparatus 1111 needs to be established for each of the AP processing apparatuses 1112 that are to perform data transmission and/or reception with the IP/SCTP processing apparatus 1111.

2. Overview of Example Embodiments of the Present Invention

First, an overview of example embodiments of the present invention will be described.
(1) Technical Issues
In the above-described system 1000 illustrated in FIG. 1, the plurality of AP processing apparatuses 1220 may exist for one IP/SCTP processing apparatus 1210. In this case, there is a problem of how the gNB 1100 transmits information to each of the AP processing apparatuses 1220 via the SCTP layer.

An example object of the present invention is to perform, even when there exist a plurality of apparatuses configured to perform processing of an upper layer of the transport layer for one apparatus configured to perform processing of the transport layer or a lower layer, communication with each of the apparatuses configured to perform the processing of the upper layer, via the transport layer.

(2) Technical Features

In the example embodiments of the present invention, for example, a transport layer packet including identification information in a packet region different from a service data unit is generated, the identification information being used in an upper layer of the transport layer, and the transport layer packet is transmitted.

For example, there may exist a plurality of apparatuses (upper layer processing apparatuses) configured to perform processing of an upper layer of the transport layer, i.e., an upper application layer not including the transport layer, for one apparatus (lower layer processing apparatus) configured to perform processing of the transport layer or a lower layer, i.e., processing of any of lower layers including the transport layer. In such a case, only identification information being included in a service data unit of a transport layer packet does not allow the lower layer processing apparatus to identify each of the plurality of upper layer processing apparatuses. In contrast to this, according to the example embodiments of the present invention, identification information is included in a packet region different from the service data unit, and this allows the lower layer processing apparatus to identify each of the plurality of upper layer processing apparatuses.

This, for example, enables, even when there exist a plurality of apparatuses configured to perform processing of an upper layer of the transport layer for one apparatus configured to perform processing of the transport layer or a lower layer, communication with each of the apparatuses configured to perform the processing of the upper layer, via the transport layer.

Note that the above-described technical features are concrete examples of the example embodiments of the present invention, and it is apparent that the present example embodiments of the present invention are not limited to the above-described technical features.

3. Configuration of System

Figure 3:
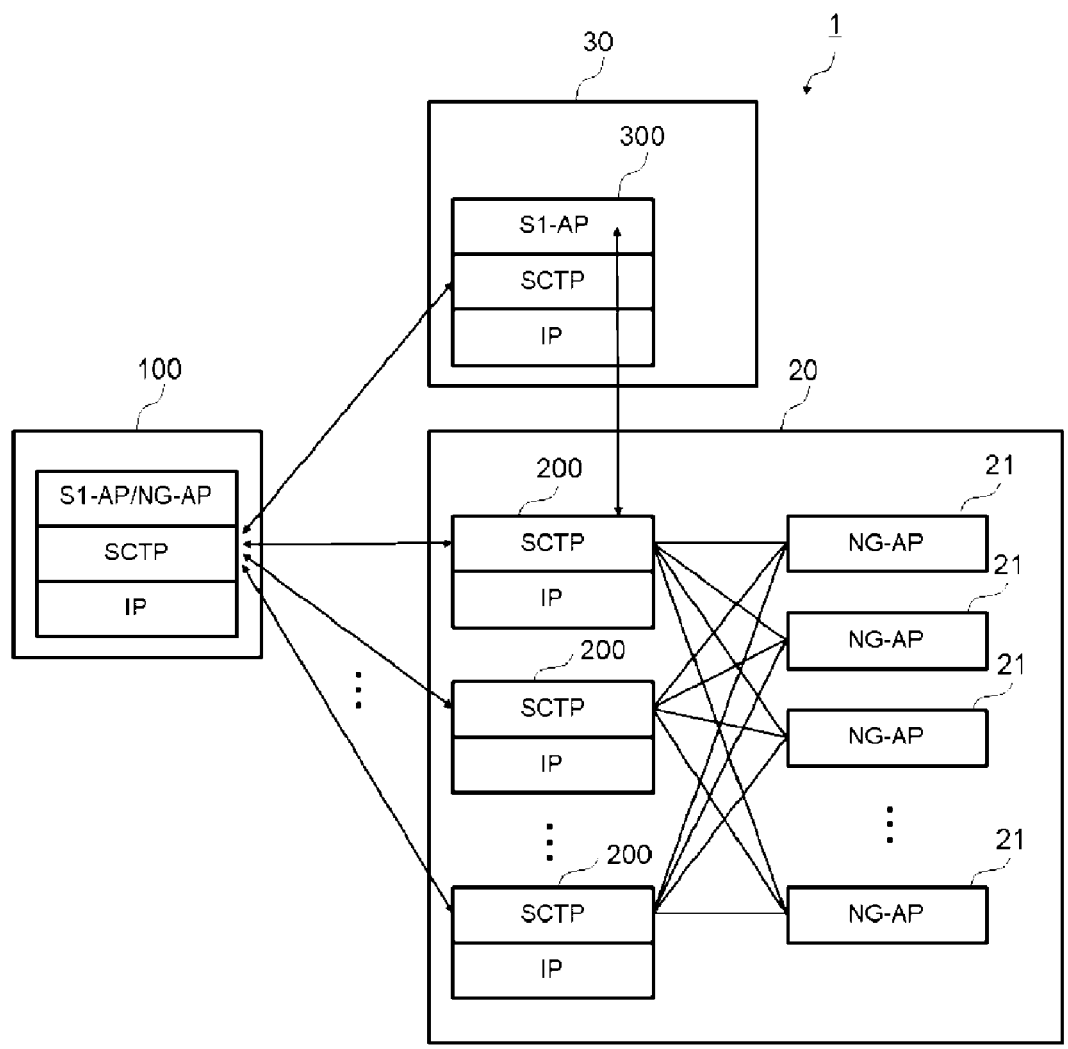
FIG. 3 is an explanatory diagram illustrating an example of a schematic configuration of a system 1 according to example embodiments of the present invention.

With reference to FIG. 3, an example of a configuration of the system 1 according to the example embodiments of the present invention will be described. FIG. 3 is an explanatory diagram illustrating an example of a schematic configuration of the system 1 according to the example embodiments of the present invention. With reference to FIG. 3, the system 1 includes a base station 100, a first type core network 20, and a second type core network 30.

For example, the system 1 is a system conforming to Third Generation Partnership Project (3GPP) standards. More specifically, the system 1 may be a system conforming to LTE/LTE-Advanced and/or System Architecture Evolution (SAE). Alternatively, the system 1 may be a system conforming to fifth-generation (5G) standards. The system 1 is, of course, not limited to these examples.

(1) Base Station 100

The base station 100 is a radio access network (RAN) node and is configured to perform wireless communication with user equipments (terminal apparatuses), located in the coverage area of the base station 100.

The base station 100 is a node configured to perform wireless communication with a terminal apparatus, in other words, a radio access network (RAN) node. For example, the base station 100 may be an evolved Node B (eNB) or may be a generation Node B (gNB) in 5G. The base station 100 may include a plurality of units (or a plurality of nodes). The plurality of units (or the plurality of nodes) may include a first unit (or a first node) configured to perform upper protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 100 may be a single unit (or a single node). In this case, the base station 100 may be one of the plurality of units (e.g., either one of the first unit and the second unit) or may be connected to another unit of the plurality of units (e.g., the other one of the first unit and the second unit).

(2) First Type Core Network 20

The first type core network 20 is, for example, a core network in 5G and includes a plurality of IP/SCTP processing apparatuses 200 configured to perform IP/SCTP processing and a plurality of AP processing apparatuses 21 configured to perform processing of the AP, which is an upper layer of SCTP. For example, each of the apparatuses is a virtual apparatus implemented by network function virtualization (NFV). Alternatively, part of or all the apparatuses may be physical apparatuses.

Look at one IP/SCTP processing apparatus 200. The IP/SCTP processing apparatus 200 establishes SCTP association with the base station 100 and performs data transmission and/or reception with the base station 100, and also communicates with a plurality of AP processing apparatuses 21.

(3) Second Type Core Network 30

The second type core network 30 is, for example, a core network in 3G/4G and includes a control entity 300. For example, the control entity 300 performs processing of each of IP/SCTP/S1-AP. The control entity 300 also establishes SCTP association with the base station 100 and performs data transmission and/or reception with the base station 100. For example, the control entity 300 is a mobility management entity (MME).

Note that the control entity 300 may perform only S1-AP processing, and an IP/SCTP processing apparatus(es) may perform processing of lower layers of the S1-AP layer. In this case, the control entity 300 may communicate with the base station 100 via the IP/SCTP processing apparatus(es) 200.

4. First Example Embodiment

Next, a description will be given of a first example embodiment of the present invention with reference to FIG. 4 to FIG. 11B.

<4.1. Configuration of Base Station>

Figure 4:
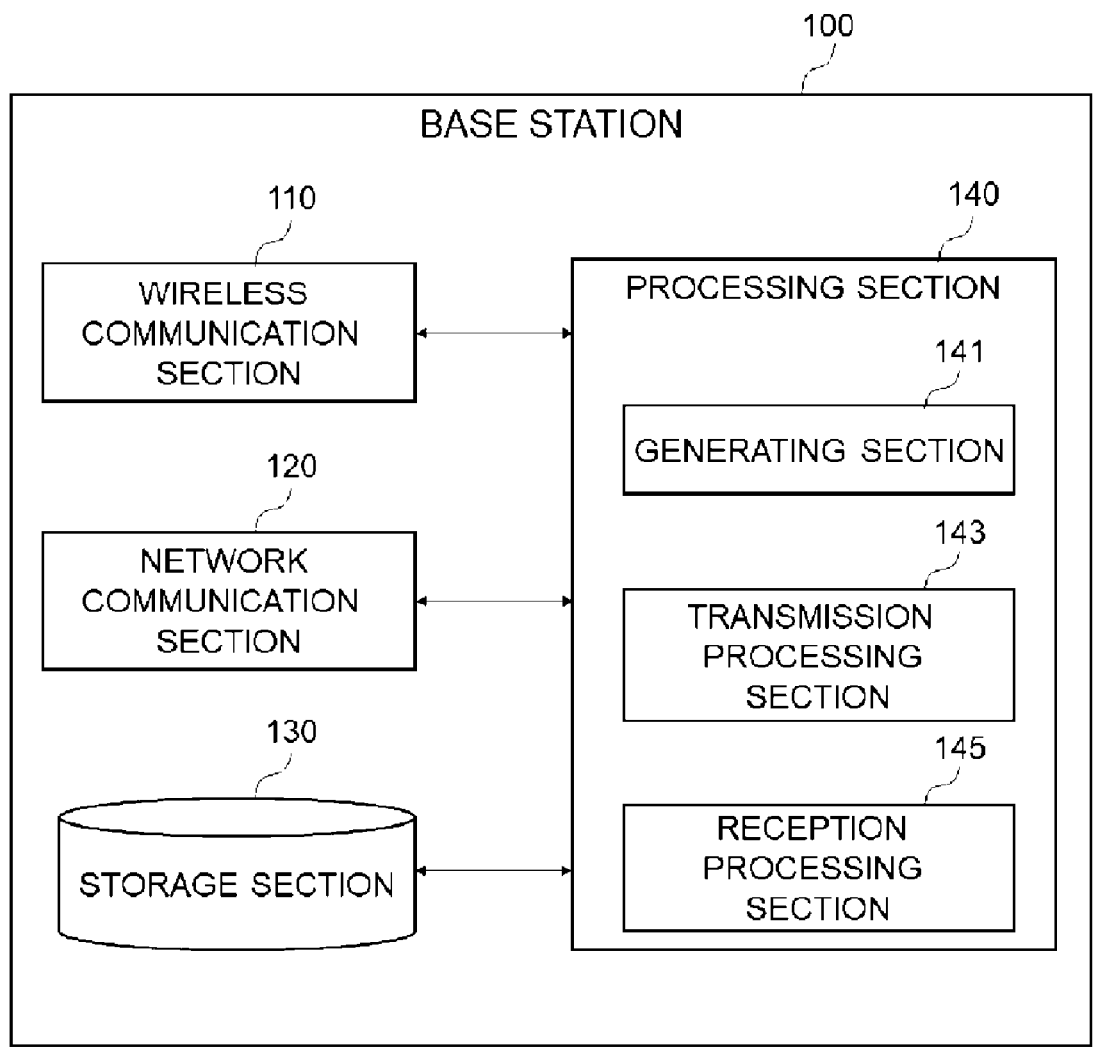
FIG. 4 is a block diagram illustrating an example of a schematic configuration of a base station 100 according to a first example embodiment.

First, with reference to FIG. 4, a description will be given of an example of a configuration of a base station 100 according to the first example embodiment. FIG. 4 is a block diagram illustrating an example of a schematic configuration of the base station 100 according to the first example embodiment. With reference to FIG. 4, the base station 100 includes a wireless communication section 110, a network communication section 120, a storage section 130, and a processing section 140.

(1) Wireless Communication Section 110

The wireless communication section 110 wirelessly transmits and/or receives a signal. For example, the wireless communication section 110 receives a signal from a terminal apparatus and transmits a signal to the terminal apparatus.

(2) Network Communication Section 120

The network communication section 120 receives a signal from a network and transmits a signal to the network.

(3) Storage Section 130

The storage section 130 temporarily or permanently stores programs (instructions) and parameters for operations of the base station 100 as well as various data. The program includes one or more instructions for operations of the base station 100.

(4) Processing Section 140

The processing section 140 provides various functions of the base station 100. The processing section 140 includes a generating section 141, a transmission processing section 143, and a reception processing section 145. Note that the processing section 140 may further include constituent elements other than these constituent elements. In other words, the processing section 140 may also perform operations other than the operations of these constituent elements. Concrete operations of the generating section 141, the transmission processing section 143, and the reception processing section 145 will be described later in detail.

For example, the processing section 140 (transmission processing section 143) transmits data to other apparatuses (e.g., the IP/SCTP processing apparatuses 200 included in the first type core network 20 and the control entity 300 included in the second type core network 30) via the network communication section 120.

(5) Implementation Example

The wireless communication section 110 may be implemented with an antenna, a radio frequency (RF) circuit, and the like, and the antenna may be a directional antenna. The network communication section 120 may be implemented with a network adapter and/or a network interface card, and the like. The storage section 130 may be implemented with a memory (e.g., a nonvolatile memory and/or a volatile memory) and/or a hard disk, and the like. The processing section 140 may be implemented with a baseband (BB) processor and/or a different processor, and the like. The generating section 141, the transmission processing section 143, and the reception processing section 145 may be implemented with the same processor or may be implemented with separate processors. The memory (storage section 130) may be included in such a processor (chip).

The base station 100 may include a memory configured to store a program (instructions) and one or more processors that can execute the program (instructions). The one or more processors may execute the program and thereby perform operations of the processing section 140 (operations of the generating section 141, the transmission processing section 143, and/or the reception processing section 145). The program may be a program for causing the processor(s) to execute operations of the processing section 140 (operations of the generating section 141, the transmission processing section 143, and/or the reception processing section 145).

<4.2. Configuration of IP/SCTP Processing Apparatuses>

Figure 5:
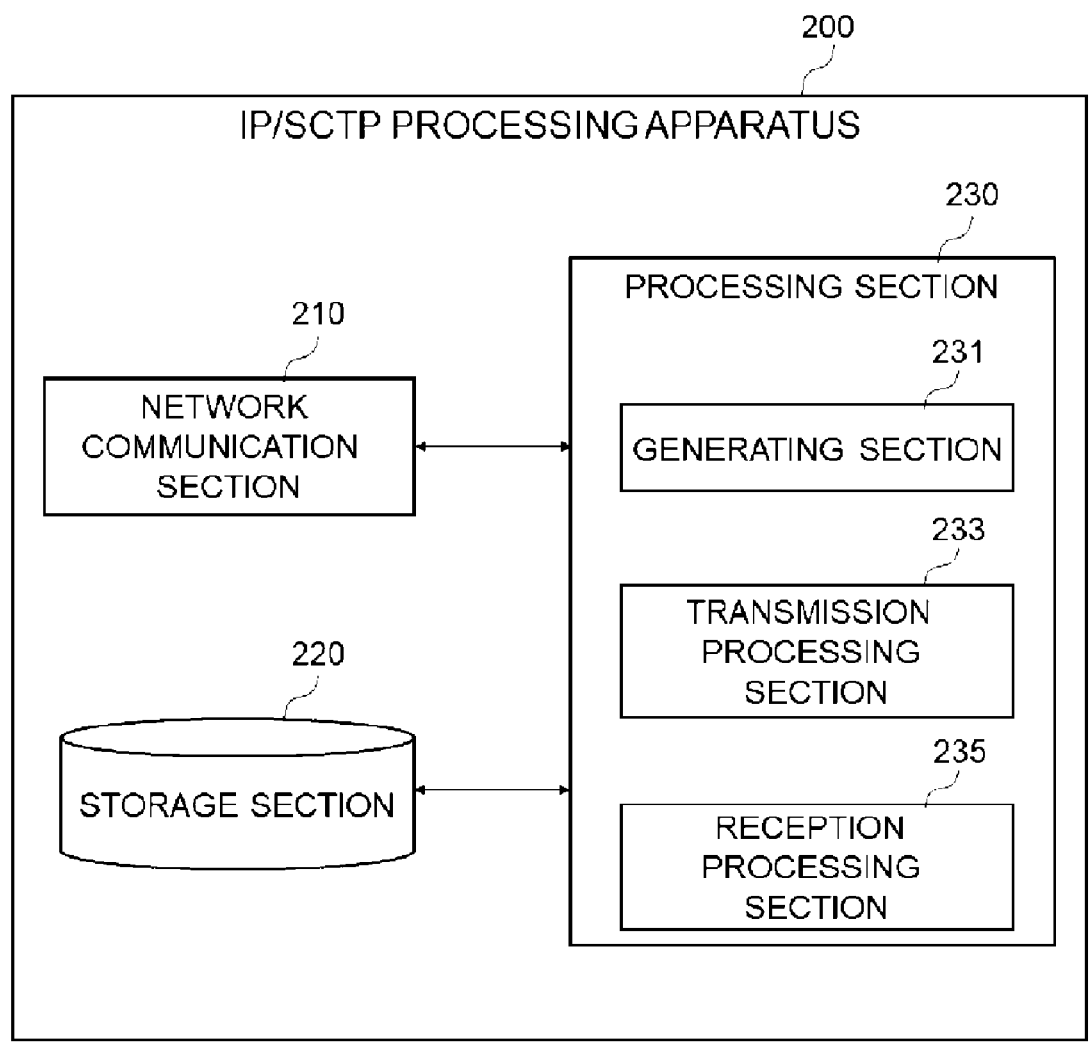
FIG. 5 is a block diagram illustrating an example of a schematic configuration of an IP/SCTP processing apparatus 200 according to the first example embodiment.

Next, with reference to FIG. 5, an example of a configuration of the IP/SCTP processing apparatuses 200 according to the first example embodiment will be described. FIG. 5 is a block diagram illustrating an example of a schematic configuration of the IP/SCTP processing apparatus 200 according to the first example embodiment. With reference to FIG. 5, the IP/SCTP processing apparatus 200 includes a network communication section 210, a storage section 220, and a processing section 230.

(1) Network Communication Section 210

The network communication section 210 receives a signal from the network and transmits a signal to the network.

(2) Storage Section 220

The storage section 220 temporarily or permanently stores programs and parameters for operations of the IP/SCTP processing apparatus 200 as well as various data.

(3) Processing Section 230

The processing section 230 provides various functions of the IP/SCTP processing apparatus 200. The processing section 230 includes a generating section 231, a transmission processing section 233, and a reception processing section 235. Note that the processing section 230 may further include constituent elements other than these constituent elements. In other words, the processing section 230 may also perform operations other than the operations of these constituent elements. Concrete operations of the generating section 231, the transmission processing section 233, and the reception processing section 235 will be described later in detail.

For example, the processing section 230 communicates with other apparatuses via the network communication section 210. Specifically, for example, the processing section 230 (transmission processing section 233) communicates with the base station 100 (or the control entity 300 included in the second type core network 30) via the network communication section 210.

(4) Implementation Example

The network communication section 210 may be implemented with a network adapter or a network interface card, and the like. The storage section 220 may be implemented with a memory (e.g., a nonvolatile memory and/or a volatile memory) and/or a hard disk, and the like. The processing section 230 may be implemented with a processor and the like. The generating section 231, the transmission processing section 233, and the reception processing section 235 may be implemented with the same processor or may be implemented with separate processors. The memory (storage section 220) may be included in such a processor (chip).

The IP/SCTP processing apparatus 200 may include a memory configured to store a program and one or more processors that can execute the program, and the one or more processors may perform operations of the processing section 230 (operations of the generating section 231, the transmission processing section 233, and/or the reception processing section 235). The program may be a program for causing the processor(s) to execute operations of the processing section 230 (operations of the generating section 231, the transmission processing section 233, and/or the reception processing section 235).

<4.3. Technical Features>

Next, technical features of the first example embodiment will be described with reference to FIG. 6 to FIG. 11B.

(1) Basic Example

The base station 100 (generating section 141) generates a transport layer packet including identification information in a packet region different from a service data unit, the identification information being used in an upper layer of the transport layer. The base station 100 (transmission processing section 143) then transmits the transport layer packet to a core network (first type core network 20). Here, the upper layer of the transport layer is specifically an upper application layer not including the transport layer. The packet region different from the service data unit is, for example, a header of the transport layer packet, a chunk, or the like.

The transport layer packet may be transmitted from any of the IP/SCTP processing apparatuses 200 to the base station 100.

(1-1) Configuration of Transport Layer Packet

The transport layer packet is, for example, an SCTP packet. For example, the base station 100 transmits the SCTP packet to the IP/SCTP processing apparatuses 200.

The upper layer of the transport layer packet is, for example, an application layer. In other words, the service data unit included in the SCTP packet is application layer data. This application layer data is processed, for example, by the AP processing apparatuses 21, the control entity 300, and the like in accordance with the AP. This application layer may be referred to as a radio network layer (RNL), for example.

Identification Information

The identification information is, for example, identification information for a user equipment in the upper layer of the transport layer (e.g., the application layer). In particular, the identification information is an application protocol identifier. The user equipment is, for example, a user equipment (UE) configured to communicate with the base station 100 through a Uu interface.

More specifically, the identification information is identification information that identifies a connection associated with the user equipment. Here, the connection associated with the user equipment is, for example, a connection between the base station 100 and any of the AP processing apparatuses 21 in the application layer.

For example, the identification information is information for identifying one connection point of the connection associated with the user equipment. The information for identifying the one connection point, for example, identifies the base station 100 or identifies the AP processing apparatus 21. The identification information may, for example, be referred to as an NG-AP ID.

The transport layer packet may include a plurality of pieces of identification information. For example, the transport layer packet may include first identification information that identifies the one connection point (e.g., the base station 100) and second identification information for identifying the other connection point (e.g., the AP processing apparatus 21).

User Identifier

The transport layer packet may further include a user identifier for identifying the user equipment. The user identifier is, for example, an identifier for identifying the user equipment (UE) in the application layer.

Determination Information

The transport layer packet may include first determination information for determining whether the identification information identifies the one connection point or identifies the other connection point. For example, a flag indicating 0 or 1 may be used as the first determination information. Specifically, in a case that the identification information identifies the one connection point (e.g., the base station 100), the flag used as the first determination information indicates 0. In a case that the identification information identifies the other connection point (e.g., the AP processing apparatus 21), the flag used as the first determination information indicates 1.

The transport layer packet may include second determination information that determines whether the connection point of the connection associated with the user equipment is the first type core network 20 or the second type core network 30. For example, a flag indicating 0 or 1 may be used as the second determination information. Specifically, in a case that the identification information identifies the AP processing apparatus 21 included in the first type core network 20, the flag used as the second determination information indicates 0. In a case that the identification information identifies the control entity 300 included in the second type core network 30, the flag used as the second determination information indicates 1.

For example, assume a case that the transport layer packet is transmitted from the base station 100 to the IP/SCTP processing apparatus 200. When the flag used as the second determination information indicates 0, the IP/SCTP processing apparatus 200 may transmit the service data unit to the AP processing apparatus 21 in the first type core network 20; when the flag used as the second determination information indicates 1, the IP/SCTP processing apparatus 200 may transmit the service data unit to the control entity 300 in the second type core network 30.

Path Identifier

The transport layer packet may further include a path identifier for identifying a path for the connection associated with the user equipment. Specifically, the path identifier is, for example, information for specifying a physical path, interface, or the like to be used for SCTP association.

Concrete Example 1

The identification information is, for example, included in the header of the transport layer packet. For example, the transport layer packet is an SCTP packet, and the header is an SCTP common header.

Figure 6:
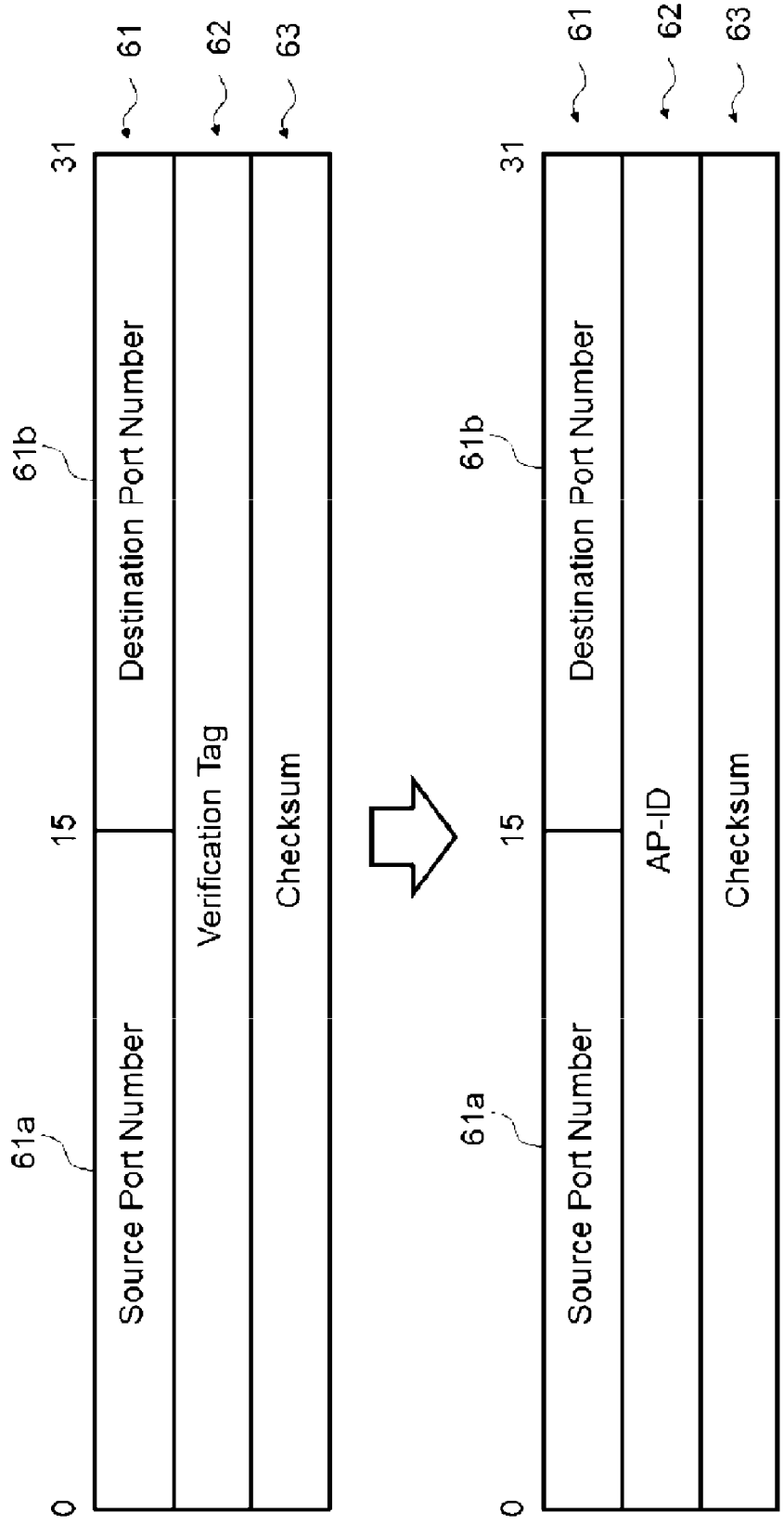
FIG. 6 is a diagram illustrating a configuration example of a common header of an SCTP packet.

FIG. 6 is a diagram illustrating a configuration example of a common header of an SCTP packet. As illustrated in FIG. 6, the common header of the SCTP packet includes a first region 61 for a source port number 61a and a destination port number 61b, a third region 63 for a checksum, and a second region 62 located between the first region 61 and the third region 63. The second region 62 is a region for a verification tag.

The identification information is included in the second region 62 in the SCTP common header. For example, as illustrated in FIG. 6, the second region 62, i.e., the region for a verification tag, is used as a region AP-ID for the identification information.

Here, the region for a verification tag is a region in which each of both end points of the SCTP can set an arbitrary integer. Hence, the region AP-ID can include the identification information without affecting RFC specifications and operations of existing systems.

Note that, for the specification in RFC 4960, the region for a verification tag needs to have a unique ID for each single SCTP association. Hence, in a case that a plurality of regions AP-ID are included in one SCTP association, needed is to change SCTP functions based on RFC 4960, for example, to invalidate an authentication function for verification tag.

Figure 7:
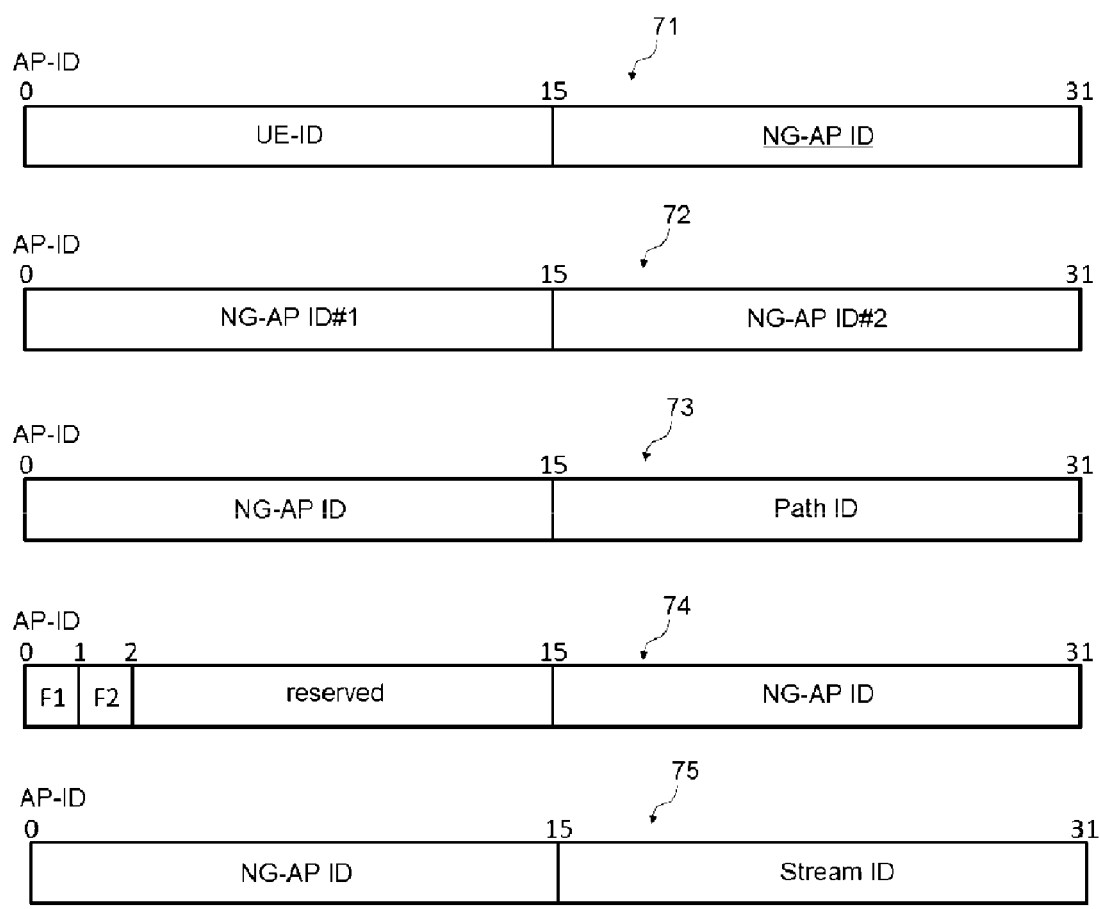
FIG. 7 is a diagram illustrating configuration examples of a second region (the region AP-ID)

FIG. 7 is a diagram illustrating configuration examples of a second region (the region AP-ID).

For example, a second region 71 in a first example includes a 16-bit user identifier UE-ID and 16-bit identification information NG-AP ID.

A second region 72 in a second example includes 16-bit first identification information NG-AP ID #1 and 16-bit second identification information NG-AP ID #2.

A second region 73 in a third example includes 16-bit identification information NG-AP ID and 16-bit path identifier Path ID.

A second region 74 in a fourth example includes 16-bit identification information NG-AP ID, 1-bit first determination information F1, and 1-bit second determination information F2.

A second region 75 in a fifth example includes 16-bit identification information NG-AP ID and a 16-bit stream identifier Stream ID. Here, the stream identifier is information for uniquely identifying a stream included in the SCTP association. With such a configuration, the identification information NG-AP ID can be associated with the stream identifier Stream ID.

Note that the second region is not limited to the examples illustrated in FIG. 7 as long as including the identification information.

Concrete Example 2

The identification information may be, for example, included outside the header of the transport layer packet. For example, the transport layer packet is the SCTP packet, and the header is an SCTP common header.

(Example of SCTP INIT Chunk/SCTP INIT ACK Chunk)

For example, the identification information may be included in an SCTP chunk. Here, the chunk is, for example, an SCTP INIT chunk or an SCTP INIT ACK chunk.

Figure 8:
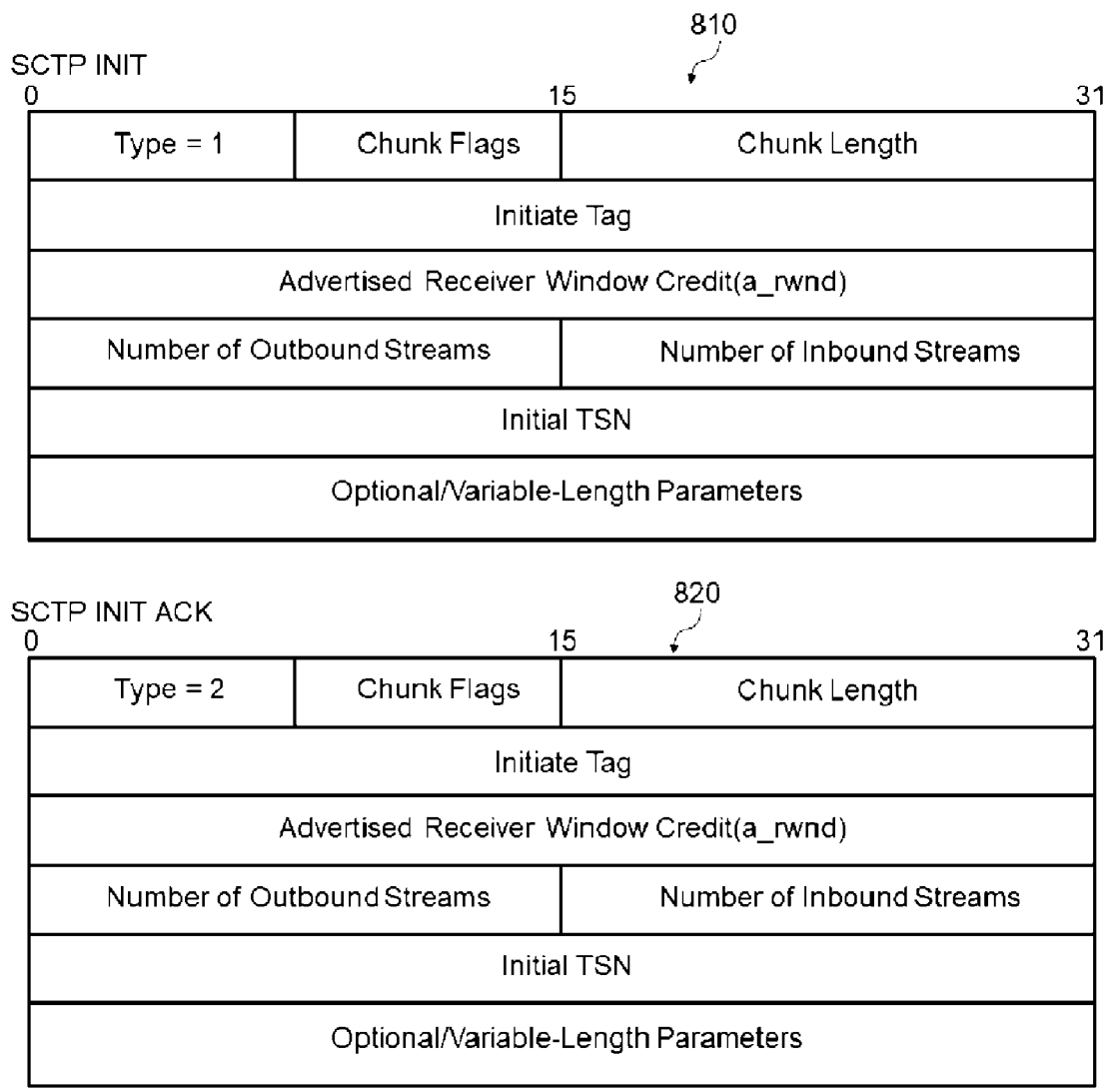
FIG. 8 is a diagram illustrating an example of a configuration of an SCTP INIT chunk 810 and an example of a configuration of an SCTP INIT ACK chunk 820.

FIG. 8 is a diagram illustrating an example of a configuration of an SCTP INIT chunk 810 and an example of a configuration of an SCTP INIT ACK chunk 820. As illustrated in FIG. 8, each of the SCTP INIT chunk 810 and the SCTP INIT ACK chunk 820 includes a region for variable-length parameters as an option.

The region for variable-length parameters can include a plurality of regions AP-ID. In other words, the region for variable-length parameters can include a plurality of pieces of identification information.

Figure 9:
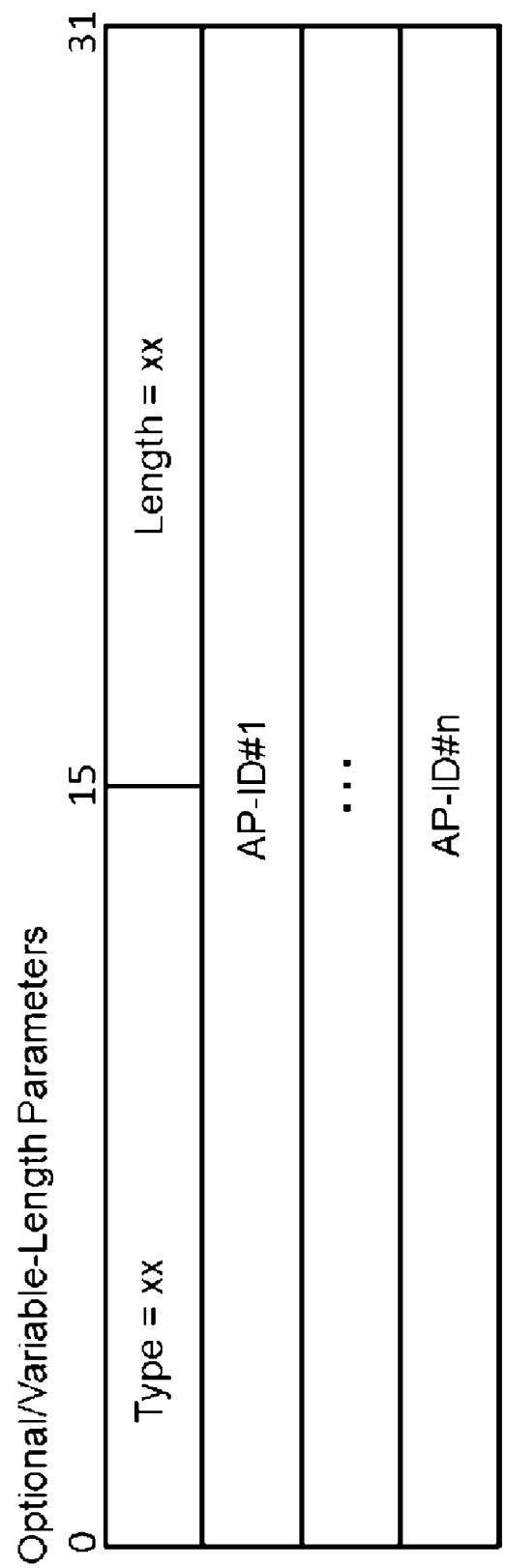
FIG. 9 is a diagram illustrating an example of the identification information included in the regions for variable-length parameters.

FIG. 9 is a diagram illustrating an example of the plurality of regions AP-ID included in the region for variable-length parameters. As illustrated in FIG. 9, the region for variable-length parameters can include n (n is any integer equal to or greater than two) regions AP-ID #1, . . . , AP-ID #n.

The above-mentioned configurations in the first to fifth examples illustrated in FIG. 7, for example, are applicable to the regions AP-ID #1, . . . , AP-ID #n. Note that the regions AP-ID #1, . . . , AP-ID #n are not limited to the examples illustrated in FIG. 7.

FIG. 10 is a diagram illustrating an example of types of optional parameters for defining the regions AP-ID in the region for variable-length parameters. For example, by defining the types of optional parameters as illustrated in FIG. 10, the region for variable-length parameters can include the regions AP-ID.

(Example of SCTP DATA Chunk)

The chunk may be an SCTP DATA chunk. In other words, the identification information may be included in the SCTP DATA chunk.

The SCTP DATA chunk includes a region for data (e.g., a region User Data for user data). For example, the identification information NG-AP ID is included in the region User Data.

For example, a case of including one piece of identification information NG-AP ID in the region User Data will be described. In this case, for example, the region AP-ID for the identification information NG-AP ID is included in a 4-byte field located at the beginning of the region User Data. Such mapping enables the receiving side to identify the location of the region AP-ID.

In a case of including one piece of identification information NG-AP ID in the region User Data, for example, the above-described configurations of the first to fifth examples illustrated in FIG. 7 are applicable to the region AP-ID for the identification information NG-AP ID. Note that the regions AP-ID #1, . . . , AP-ID #n are not limited to the examples illustrated in FIG. 7.

Figure 11A:
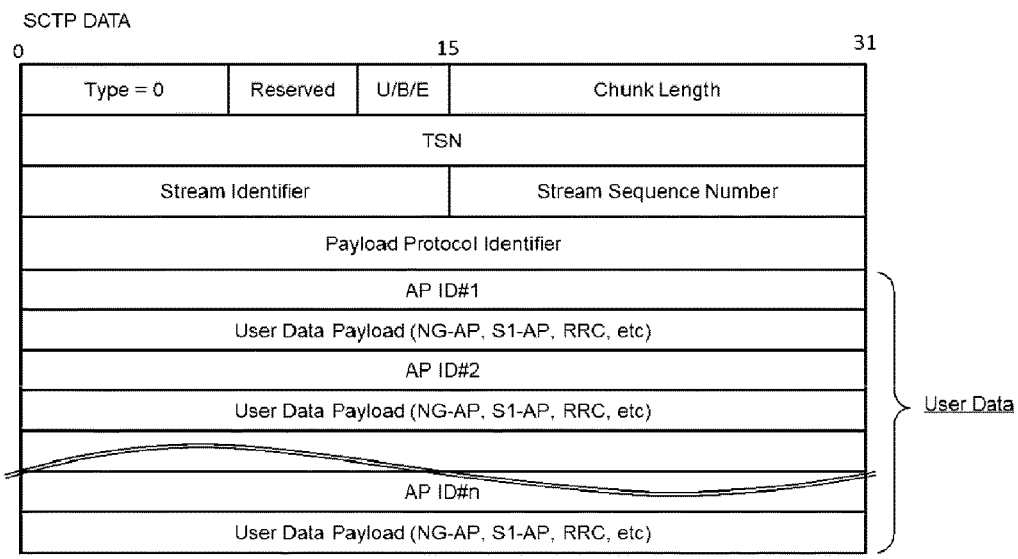
FIG. 11A and FIG. 11B are diagrams for describing an example including a plurality of pieces of identification information NG-AP ID in a region User Data.
Figure 11B:
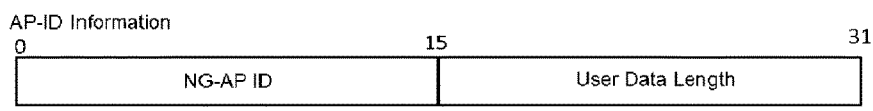

FIG. 11A and FIG. 11B are diagrams for describing an example including the plurality of pieces of identification information NG-AP ID in the region User Data.

FIG. 11A is a diagram illustrating a configuration of the entire SCTP DATA chunk. For example, as illustrated in FIG. 11A, the region for data (region User Data) can include n (n is any integer equal to or greater than two) regions AP-ID #1, . . . , AP-ID #n. The pieces of identification information NG-AP ID for users are included in the respective regions AP-ID #1, . . . , AP-ID #n. For example, look at one user. One region AP-ID and a region User Data Payload following the one region AP-ID are allocated as regions for the one user.

FIG. 11B is a diagram illustrating inner configurations of the respective regions AP-ID. As illustrated in FIG. 11B, the region AP-ID includes the identification information NG-AP ID and information User DATA Length indicating the length of User DATA Payload following the region AP-ID. The information User DATA Length thus being included in the region AP-ID allows the reception side to identify an arbitrary region AP-ID.

Note that, in a case of including the identification information in the SCTP DATA chunk, the reception side of the identification information may be notified, in advance, of the region including the identification information in the region for data and the size thereof.

(1-2) Example of Transmission Processing of Transport Layer Packet

The base station 100, for example, transmits a transport layer packet to the IP/SCTP processing apparatus(es) 200 in the following manner, to thereby be able to perform application protocol processing with the AP processing apparatus(es) 21.

First, in initialization of SCTP association, the base station 100, for example, associates identification information identifying the base station 100 (source identification information) with each of streams included in the SCTP association, includes the identification information in an SCTP INIT chunk or an SCTP INIT ACK chunk, and then transmits the identification information to the IP/SCTP processing apparatus 200. In this manner, the base station 100 can notify the IP/SCTP processing apparatus 200 of NG-AP processing capability of the base station 100.

Similarly, the IP/SCTP processing apparatus 200 associates pieces of identification information identifying the AP processing apparatuses 21 with respective streams included in the SCTP association, includes each of the pieces of the identification information in an SCTP INIT chunk or an SCTP INIT ACK chunk, and transmits the identification information to the base station 100. In this way, the base station 100 can recognize the NG-AP processing capability of the first type core network 20 side.

After the SCTP association has been established, the base station 100, for example, transmits an SCTP packet including, in the SCTP common header or SCTP DATA chunk, identification information identifying the AP processing apparatus(es) 21 (transmission destination identification information) to the IP/SCTP processing apparatus 200. In this way, the IP/SCTP processing apparatus 200 can transmit the service data unit included in the SCTP packet to the AP processing apparatus(es) 21 identified by the transmission destination identification information.

As described above, identification information is included in a packet region different from the service data unit, such as an SCTP header or chunk as that described above, and this, for example, allows the IP/SCTP processing apparatus 200 to identify each of the plurality of AP processing apparatuses 21. In this way, even when there exist, on the core network side, the plurality of AP processing apparatuses 21 configured to perform processing of an upper layer of the transport layer (processing of an upper application layer not including the transport layer) for one IP/SCTP processing apparatus 200 configured to perform processing of the transport layer or a lower layer (processing of any of lower layers including the transport layer), the base station 100 can reliably communicate with each of the AP processing apparatuses 21 via the transport layer.

For example, it is possible to prevent the service data unit included in the transport layer packet from being transmitted to a wrong destination, such as a wrong AP processing apparatus 21. This avoids unnecessary retransmission processing, which consequently allows the base station 100 to communicate reliably with each of the AP processing apparatuses 21 at higher speed.

Moreover, determination information, a path identifier, a user identifier, and the like being included in a transport layer packet enables identification including identification of path information and a connection destination NG-AP in a single SCTP association. Hence, the base station 100 can perform traffic control, session management, and the like corresponding to connection destination information.

Furthermore, the base station 100 including the identification information in an SCTP DATA chunk makes it possible to notify, for each transmission of an SCTP DATA chunk, the AP processing apparatus(es) 21 of any identification information without changing SCTP association established between SCTPs of both the base station 100 and the IP/SCTP processing apparatus(es) 200.

Furthermore, it is possible to implement the above-described functions while extending the SCTP functions specified in RFC 4960. For example, establishment of a new SCTP association is not needed for processing such as NG-AP session switching and session addition.

(2) Example Alterations

The first example embodiment is not limited to the above-described processing, and various alterations are possible. As described above, the transport layer packet may be transmitted from the IP/SCTP processing apparatus 200 to a wireless communication network (e.g., the base station 100).

Specifically, the IP/SCTP processing apparatus 200 (generating section 231) may generate the transport layer packet including the identification information in a packet region different from a service data unit. The IP/SCTP processing apparatus 200 (transmission processing section 233) may transmit the transport layer packet to the wireless communication network (base station 100).

Specifically, the generating section 231 may perform similar operations to the operations of the generating section 141 included in the base station 100. The transmission processing section 233 may perform similar operations to those of the transmission processing section 143 included in the base station 100.

As described above, in a case of including identification information in an SCTP DATA chunk, the reception side of the identification information may be notified, in advance, of the region including the identification information in the region for data and the size thereof. Such information for notification may be included in, for example, an SCTP common header, an SCTP INIT chunk, or an SCTP INIT ACK chunk.

5. Second Example Embodiment

Figure 12:
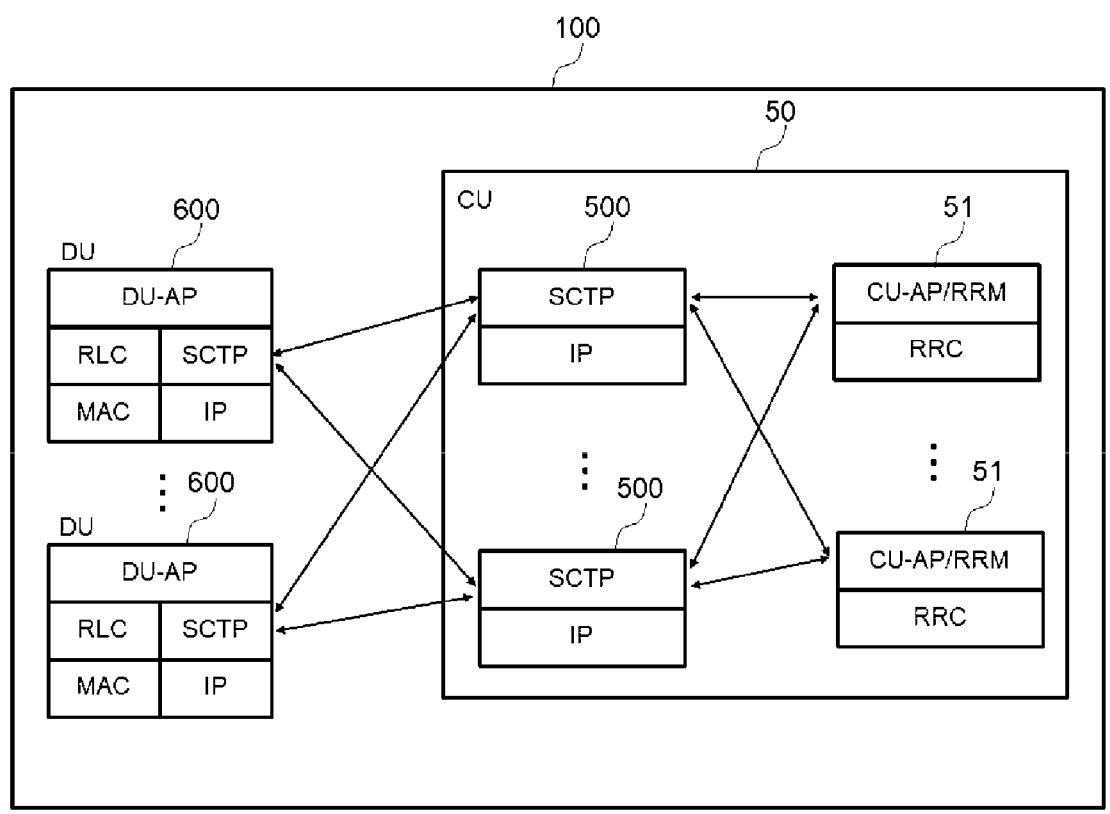
FIG. 12 is a block diagram illustrating an example of a schematic configuration of a base station 100 according to a second example embodiment.
Figure 13:
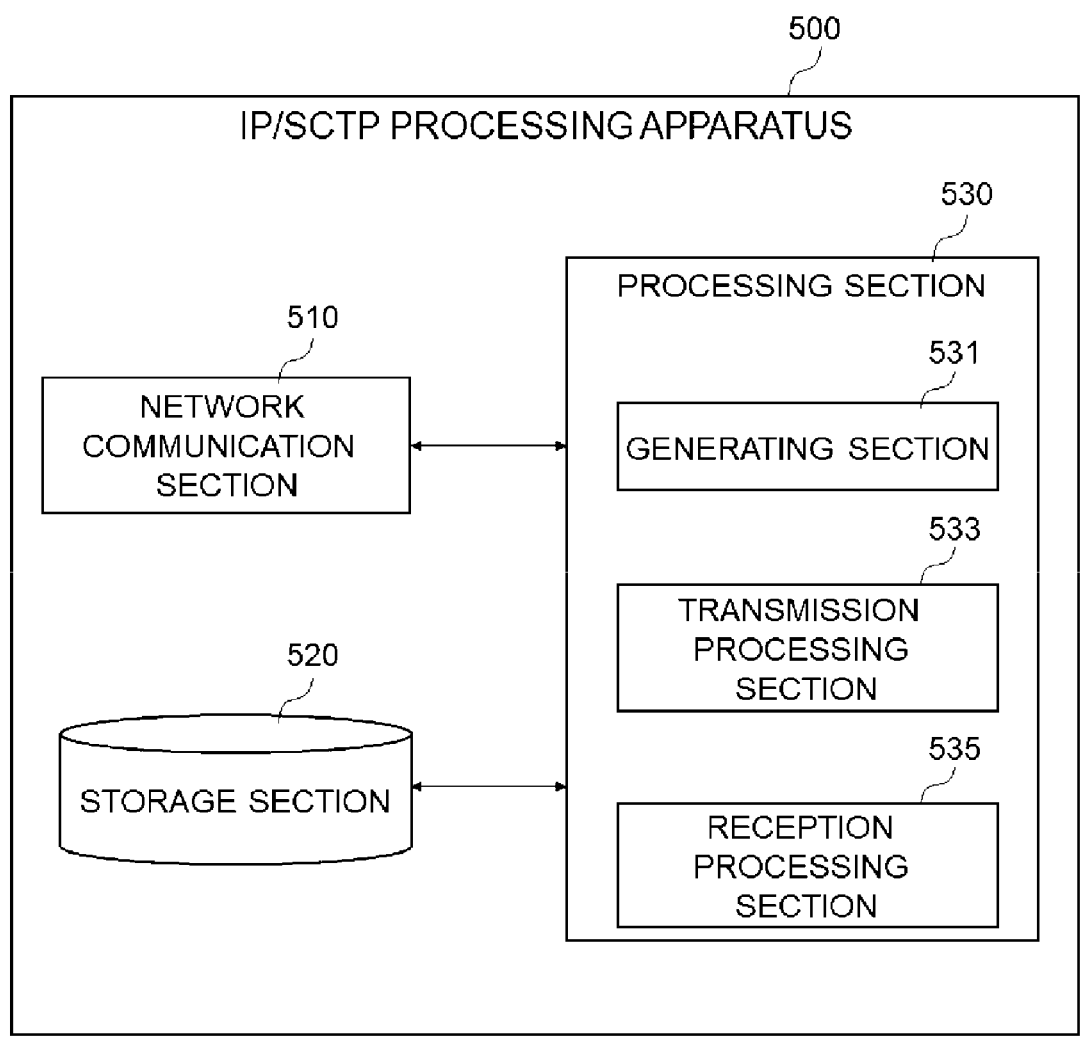
FIG. 13 is a block diagram illustrating an example of a schematic configuration of an IP/SCTP processing apparatus 500 according to the second example embodiment.
Figure 14:
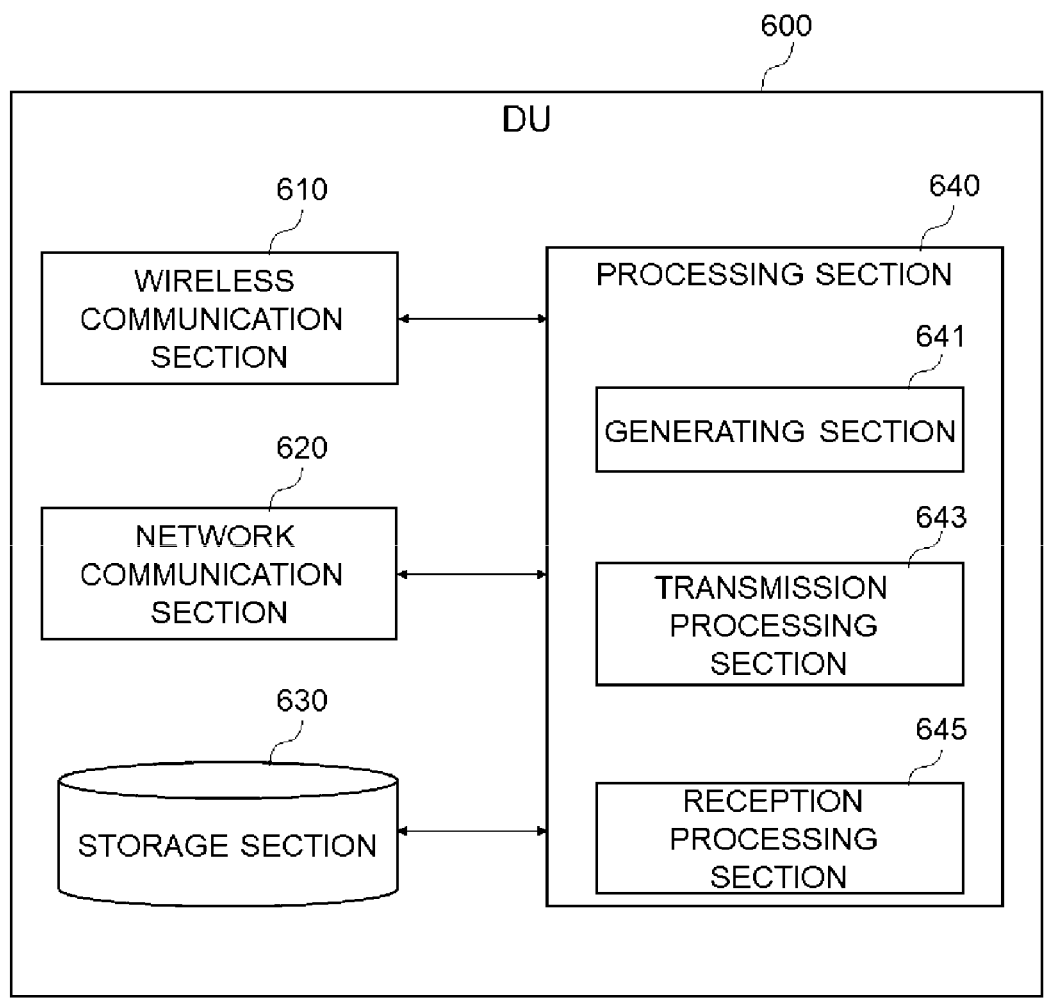
FIG. 14 is a block diagram illustrating an example of a schematic configuration of a second node 600 according to the second example embodiment.

Next, a description will be given of a second example embodiment of the present invention with reference to FIG. 12 to FIG. 14.

First, with reference to FIG. 12, a description will be given of an example of a configuration of a base station 100 according to the second example embodiment. FIG. 12 is a block diagram illustrating an example of a schematic configuration of the base station 100 according to the second example embodiment. With reference to FIG. 12, the base station 100 includes a central unit (CU) 50 and radio units (DUs) 600.

(1) CU 50

The CU 50 is a first unit of a wireless communication network configured to communicate with a core network. The CU 50 includes a plurality of IP/SCTP processing apparatuses 500 configured to perform IP/SCTP processing and a plurality of AP processing apparatuses 51 configured to perform upper layer (CU-AP/RRM) processing. For example, each of the apparatuses is a virtual apparatus implemented through network function virtualization (NFV). Alternatively, part of or all the apparatuses may be physical apparatuses. The AP processing apparatuses 51 perform upper layer (CU-AP/RRM) processing, such as radio resource control (RRC) management, for example.

Look at one IP/SCTP processing apparatus 500. The IP/SCTP processing apparatus 500 establishes SCTP association with each of the DUs 600 and performs data transmission and/or reception with the DU 600, and also communicates with the plurality of AP processing apparatuses 51.

(2) DU 600

Each of the DUs 600 is a second unit of a wireless access network configured to communicate with a terminal apparatus. The DU 600, for example, performs transmission and/or reception of data with a user equipment (UE) through a Uu interface and performs transmission and/or reception of data with each of the IP/SCTP processing apparatuses 500 included in the CU 50.

<5.1. Configuration of IP/SCTP Processing Apparatuses>

Next, with reference to FIG. 13, an example of a configuration of the IP/SCTP processing apparatuses 500 according to the second example embodiment will be described. FIG. 13 is a block diagram illustrating an example of a schematic configuration of the IP/SCTP processing apparatus 500 according to the second example embodiment. With reference to FIG. 13, the IP/SCTP processing apparatus 500 includes a network communication section 510, a storage section 520, and a processing section 530.

(1) Network Communication Section 510

The network communication section 510 receives a signal from a wireless communication network and transmits a signal to the wireless communication network.

(2) Storage Section 520

The storage section 520 temporarily or permanently stores programs and parameters for operations of the IP/SCTP processing apparatus 500 as well as various data.

(3) Processing Section 530

The processing section 530 provides various functions of the IP/SCTP processing apparatus 500. The processing section 530 includes a generating section 531, a transmission processing section 533, and a reception processing section 535. Note that the processing section 530 may further include constituent elements other than these constituent elements. In other words, the processing section 530 may also perform operations other than the operations of these constituent elements. Concrete operations of the generating section 531, the transmission processing section 533, and the reception processing section 535 will be described later in detail.

For example, the processing section 530 communicates with other apparatuses via the network communication section 510. Specifically, for example, the processing section 530 (transmission processing section 533) communicates with the DUs 600 via the network communication section 510.

(4) Implementation Example

The network communication section 510 may be implemented with a network adapter or a network interface card, and the like. The storage section 520 may be implemented with a memory (e.g., a nonvolatile memory and/or a volatile memory) and/or a hard disk, and the like. The processing section 530 may be implemented with a processor and the like. The generating section 531, the transmission processing section 533, and the reception processing section 535 may be implemented with the same processor or may be implemented with separate processors. The memory (storage section 520) may be included in such a processor (chip).

The IP/SCTP processing apparatus 500 may include a memory configured to store a program and one or more processors that can execute the program, and the one or more processors may perform operations of the processing section 530 (operations of the generating section 531, the transmission processing section 533, and/or the reception processing section 535). The program may be a program for causing the processor(s) to execute operations of the processing section 530 (operations of the generating section 531, the transmission processing section 533, and/or the reception processing section 535).

<5.2. Configuration of DUs>

First, with reference to FIG. 14, a description will be given of an example of a configuration of the DUs 600 according to the second example embodiment. FIG. 14 is a block diagram illustrating an example of a schematic configuration of the DU 600 according to the second example embodiment. With reference to FIG. 14, the DU 600 includes a wireless communication section 610, a network communication section 620, a storage section 630, and a processing section 640.

(1) Wireless Communication Section 610

The wireless communication section 610 wirelessly transmits and/or receives a signal. For example, the wireless communication section 610 receives a signal from a terminal apparatus and transmits a signal to the terminal apparatus.

(2) Network Communication Section 620

The network communication section 620 receives a signal from a wireless communication network and transmits a signal to the wireless communication network.

(3) Storage Section 630

The storage section 630 temporarily or permanently stores programs (instructions) and parameters for operations of the DU 600 as well as various data. The program includes one or more instructions for operations of the DU 600.

(4) Processing Section 640

The processing section 640 provides various functions of the DU 600. The processing section 640 includes a generating section 641, a transmission processing section 643, and a reception processing section 645. Note that the processing section 640 may further include constituent elements other than these constituent elements. In other words, the processing section 640 may also perform operations other than the operations of these constituent elements. Concrete operations of the generating section 641, the transmission processing section 643, and the reception processing section 645 will be described later in detail.

For example, the processing section 640 (transmission processing section 643) transmits data to the CU 50 via the network communication section 620.

(5) Implementation Example

The wireless communication section 610 may be implemented with an antenna, a radio frequency (RF) circuit, and the like, and the antenna may be a directional antenna. The network communication section 620 may be implemented with a network adapter and/or a network interface card, and the like. The storage section 630 may be implemented with a memory (e.g., a nonvolatile memory and/or a volatile memory) and/or a hard disk, and the like. The processing section 640 may be implemented with a baseband (BB) processor and/or a different processor, and the like. The generating section 641, the transmission processing section 643, and the reception processing section 645 may be implemented with the same processor or may be implemented with separate processors. The memory (storage section 630) may be included in such a processor (chip).

The DU 600 may include a memory configured to store a program (instructions) and one or more processors that can execute the program (instructions). The one or more processors may execute the program and thereby perform operations of the processing section 640 (operations of the generating section 641, the transmission processing section 643, and/or the reception processing section 645). The program may be a program for causing the processor(s) to execute operations of the processing section 640 (operations of the generating section 641, the transmission processing section 643, and/or the reception processing section 645).

<5.3. Technical Features>

Next, technical features of the second example embodiment will be described.

(1) Basic Example

Each of the DUs 600 (generating section 641) generates a transport layer packet including identification information in a packet region different from a service data unit, the identification information being used in an upper layer of the transport layer. The DU 600 (transmission processing section 643) then transmits the transport layer packet to the CU 50.

The transport layer packet may be transmitted from the IP/SCTP processing apparatus 500 to the DU 600.

(1-1) Configuration of Transport Layer Packet

The transport layer packet is, for example, an SCTP packet. Specifically, the DU 600 transmits the SCTP packet to the IP/SCTP processing apparatus(es) 500.

The upper layer of the transport layer packet is, for example, an application layer. In other words, the service data unit included in the SCTP packet received by the IP/SCTP processing apparatus 500 is application layer data. This application layer data is processed, for example, by the AP processing apparatus 51 or the like in accordance with CU-AP/RRM.

Identification Information

The identification information is, for example, identification information for a user equipment in the upper layer of the transport layer (e.g., the application layer). In particular, the identification information is an application protocol identifier. The user equipment is, for example, a user equipment (UE) configured to communicate with the base station 100 through a Uu interface.

More specifically, the identification information is identification information that identifies a connection associated with the user equipment. Here the connection associated with the user equipment is, for example, a connection between the DU 600 and the AP processing apparatus 51.

For example, the identification information is information for identifying one connection point of the connection associated with the user equipment. The information for identifying the one connection point, for example, identifies the DU 600 or identifies the AP processing apparatus 51. The identification information may, for example, be referred to as an NG-AP ID.

The transport layer packet may include a plurality of pieces of identification information. For example, the transport layer packet may include first identification information that identifies the one connection point (e.g., the DU 600) and second identification information for identifying the other connection point (e.g., the AP processing apparatus 51).

For example, the identification information may be a cell identifier (Cell ID) that identifies a cell used for the connection associated with the user equipment or an identifier (DU-AP ID) for identifying a radio unit DU in the application layer.

User Identifier

The transport layer packet may further include a user identifier for identifying the user equipment. The user identifier is, for example, an identifier for identifying the user equipment (UE) in the application layer. The user identifier may, for example, be a radio network temporary identity (RNTI).

Others

The transport layer packet, as in the above-described first example embodiment, may include first determination information for determining whether the identification information identifies the one connection point or the other connection point.

(2) Example Alterations

The second example embodiment is not limited to the above-described processing, and various alterations are possible. For example, the transport layer packet may be transmitted from the IP/SCTP processing apparatus(es) 500 to the DU(s) 600.

Specifically, the IP/SCTP processing apparatus 500 (generating section 531) may generate the transport layer packet including the identification information in a packet region different from a service data unit. The IP/SCTP processing apparatus 500 (transmission processing section 533) may transmit the transport layer packet to the DU 600.

Specifically, the generating section 531 may perform similar operations to the operations of the generating section 641 included in the DU 600. The transmission processing section 533 may perform similar operations to those of the transmission processing section 643 included in the DU 600.

Furthermore, each of the DUs 600 may be separated into an apparatus configured to perform IP/SCTP processing and an apparatus configured to perform AP processing. In this case, the apparatus included in the DU 600 and configured to perform IP/SCTP processing may generate the transport layer packet and transmit the generated transport layer packet to the IP/SCTP processing apparatus(es) 500 included in the CU 50.

(3) Summary

The second example embodiment has been described above. According to the second example embodiment, identification information is included in a packet region different from a service data unit, and this, for example, allows the IP/SCTP processing apparatus 500 to identify each of the plurality of AP processing apparatuses 51. In this way, even when there exist a plurality of apparatuses configured to perform processing of an upper layer of the transport layer (processing of an upper application layer not including the transport layer) for one apparatus configured to perform processing of the transport layer or a lower layer (processing of any of lower layers including the transport layer), communication can be reliably performed with each of the apparatuses configured to perform processing of the upper layer via the transport layer.

6. Third Example Embodiment

Figure 15:
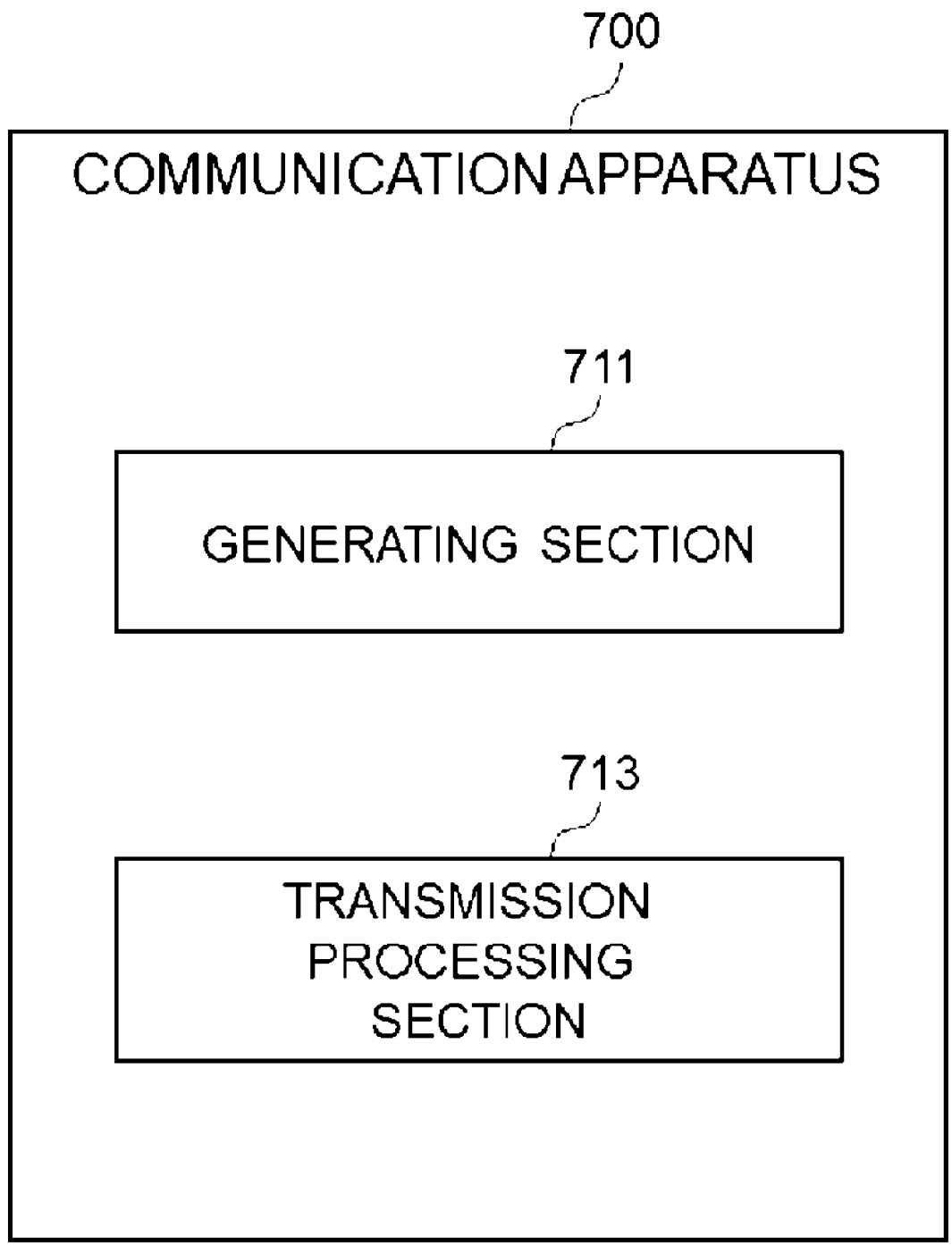
FIG. 15 is a block diagram illustrating an example of a schematic configuration of a communication apparatus 700 according to a third example embodiment.

Next, a description will be given of a third example embodiment of the present invention with reference to FIG. 15. The above-described first example embodiment and second example embodiment are concrete example embodiments, whereas the third example embodiment is a more generalized example embodiment.

<6.1. Configuration of Communication Apparatus>

First, with reference to FIG. 15, an example of a configuration of a communication apparatus 700 according to the third example embodiment will be described. FIG. 15 is a block diagram illustrating an example of a schematic configuration of the communication apparatus 700 according to the third example embodiment. With reference to FIG. 15, the communication apparatus 700 includes a generating section 711 and a transmission processing section 713. Concrete operations of the generating section 711 and the transmission processing section 713 will be described later in detail.

The generating section 711 and the transmission processing section 713 may be implemented with a baseband (BB) processor and/or a different processor, and the like. The communication apparatus 700 may include a memory configured to store a program (instructions) and one or more processors that can execute the program (instructions), and the one or more processors may perform operations of the generating section 711 and the transmission processing section 713 by executing the program. The program may be a program for causing the processor(s) to execute the operations of the generating section 711 and the transmission processing section 713.

<6.2. Technical Features>

Next, technical features of the third example embodiment will be described.

In the third example embodiment, the communication apparatus 700 (generating section 711) generates a transport layer packet including identification information in a packet region different from a service data unit, the identification information being used in an upper layer of the transport layer. The communication apparatus 700 (transmission processing section 713) then transmits the transport layer packet.

For example, the communication apparatus 700 may be the base station 100 or the IP/SCTP processing apparatus 200 according to the first example embodiment described above. In other words, the generating section 711 may perform operations of the generating section 141 or the generating section 231 according to the above-described first example embodiment. The transmission processing section 713 may perform operations of the transmission processing section 143 or the transmission processing section 233 according to the above-described first example embodiment.

The communication apparatus 700 may be the IP/SCTP processing apparatus 500 or the DU 600 according to the second example embodiment described above. In other words, the generating section 711 may perform operations of the generating section 531 or the generating section 641 according to the above-described second example embodiment. The transmission processing section 713 may perform operations of the transmission processing section 533 or the transmission processing section 643 according to the above-described first example embodiment.

Note that operations of the communication apparatus 700 are not limited to the example of the operations of the base stations 100 according to the first and second example embodiments described above.

The third example embodiment has been described above. According to the third example embodiment, identification information is included in a packet region different from a service data unit, and this, for example, allows each of the IP/SCTP processing apparatuses 500 to identify each of the plurality of AP processing apparatuses 51. In this way, even when there exist a plurality of apparatuses configured to perform processing of an upper layer of the transport layer (processing of an upper application layer not including the transport layer) for one apparatus configured to perform processing of the transport layer or a lower layer (processing of any of lower layers including the transport layer), communication can be performed with each of the apparatuses configured to perform processing of the upper layer via the transport layer.

7. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, an apparatus including constituent elements (e.g., the generating section and/or the transmission processing section) of the base station described in the Specification (one or more apparatuses (or units) among a plurality of apparatuses (or units) constituting the base station or a module for one of the plurality of apparatuses (or units)) may be provided. Moreover, methods including processing of the constituent elements may be provided, and programs for causing a processor to execute processing of the constituent elements may be provided. Moreover, non-transitory computer-readable recording media (non-transitory computer readable media) having recorded thereon the programs may be provided. It is apparent that such apparatuses, modules, methods, programs, and non-transitory computer-readable recording media are also included in the present invention.

The whole or part of the example embodiments disclosed above can be described as, but not limited to, the following supplementary notes.

(Supplementary Note 1)

A communication apparatus comprising:

a generating section configured to generate a transport layer packet including identification information in a packet region different from a service data unit, the identification information being used in an upper layer of a transport layer; and a transmission processing section configured to transmit the transport layer packet.

(Supplementary Note 2)

The communication apparatus according to Supplementary Note 1, wherein the identification information is identification information used for a user equipment in the upper layer of the transport layer.

(Supplementary Note 3)

The communication apparatus according to Supplementary Note 2, wherein the identification information is identification information that identifies a connection associated with the user equipment.

(Supplementary Note 4)

The communication apparatus according to Supplementary Note 3, wherein the identification information identifies one connection point of the connection associated with the user equipment.

(Supplementary Note 5)

The communication apparatus according to any one of Supplementary Notes 1 to 4, wherein the identification information is an application protocol identifier.

(Supplementary Note 6)

The communication apparatus according to Supplementary Note 4, wherein the transport layer packet includes first identification information for identifying one connection point of the connection associated with the user equipment and second identification information for identifying another connection point of the connection associated with the user equipment.

(Supplementary Note 7)

The communication apparatus according to Supplementary Note 4 or 6, wherein the transport layer packet further includes determination information for determining whether the identification information identifies the one connection point or another connection point.

(Supplementary Note 8)

The communication apparatus according to any one of Supplementary Notes 3, 4, 6, and 7, wherein the transport layer packet further includes a path identifier for identifying a path for the connection associated with the user equipment.

(Supplementary Note 9)

The communication apparatus according to any one of Supplementary Notes 3, 4, and 6 to 8, wherein the transport layer packet further includes a user identifier for identifying the user equipment.

(Supplementary Note 10)

The communication apparatus according to any one of Supplementary Notes 1 to 9, wherein the transport layer packet is a stream control transmission protocol (SCTP) packet.

(Supplementary Note 11)

The communication apparatus according to any one of Supplementary Notes 1 to 10, wherein the upper layer is an application layer.

(Supplementary Note 12)

The communication apparatus according to any one of Supplementary Notes 1 to 11, wherein the transport layer packet includes the identification information in a header.

(Supplementary Note 13)

The communication apparatus according to Supplementary Note 12, wherein the transport layer packet is an SCTP packet; and the header is an SCTP common header.

(Supplementary Note 14)

The communication apparatus according to Supplementary Note 13, wherein the header includes a first region for a source port number and a destination port number, a third region for a checksum, and a second region located between the first region and the third region; and the transport layer packet includes the identification information in the second region in the header.

(Supplementary Note 15)

The communication apparatus according to Supplementary Note 14, wherein the second region is a region for a verification tag.

(Supplementary Note 16)

The communication apparatus according to any one of Supplementary Notes 1 to 11, wherein the transport layer packet includes the identification information outside a header.

(Supplementary Note 17)

The communication apparatus according to Supplementary Note 16, wherein the transport layer packet is an SCTP packet;

the header is an SCTP common header; and the transport layer packet includes the identification information in a chunk of SCTP.

(Supplementary Note 18)

The communication apparatus according to Supplementary Note 17, wherein the chunk is an SCTP INIT chunk or an SCTP INIT ACK chunk.

(Supplementary Note 19)

The communication apparatus according to Supplementary Note 18, wherein the chunk includes a region for a variable-length parameter; and the transport layer packet includes the identification information in the region in the chunk.

(Supplementary Note 20)

The communication apparatus according to Supplementary Note 17, wherein the chunk is an SCTP DATA chunk.

(Supplementary Note 21)

The communication apparatus according to Supplementary Note 20, wherein the chunk includes a region for data; and the transport layer packet includes the identification information in the region in the chunk.

(Supplementary Note 22)

The communication apparatus according to Supplementary Note 19 or 21, wherein the transport layer packet includes, in the region in the chunk, a plurality of pieces of identification information used for a user equipment in the upper layer.

(Supplementary Note 23)

The communication apparatus according to Supplementary Note 22, wherein the plurality of pieces of identification information are associated with a plurality of respective streams of SCTP association.

(Supplementary Note 24)

The communication apparatus according to any one of Supplementary Notes 1 to 23, wherein the communication apparatus is an apparatus included in a mobile communication system.

(Supplementary Note 25)

The communication apparatus according to any one of Supplementary Notes 1 to 24, wherein the communication apparatus is a radio access network node; and the transmission processing section is configured to transmit the transport layer packet to a core network.

(Supplementary Note 26)

The communication apparatus according to any one of Supplementary Notes 1 to 24, wherein the communication apparatus is a core network node; and the transmission processing section is configured to transmit the transport layer packet to a radio access network.

(Supplementary Note 27)

The communication apparatus according to Supplementary Note 25 or 26, wherein the identification information identifies a connection associated with a user equipment in the upper layer of the transport layer; and the transport layer packet further includes determination information that determines whether the connection point of the connection associated with the user equipment is a first type core network or a second type core network.

(Supplementary Note 28)

The communication apparatus according to any one of Supplementary Notes 1 to 24, wherein the communication apparatus is a first unit of a radio access network, the first unit communicating with a core network, or an apparatus included in the first unit; and the transmission processing section is configured to transmit the transport layer packet to a second unit of the radio access network, the second unit communicating with a user equipment.

(Supplementary Note 29)

The communication apparatus according to any one of Supplementary Notes 1 to 24, wherein the communication apparatus is a second unit of a radio access network, the second unit communicating with a user equipment, or an apparatus included in the second unit; and the transmission processing section is configured to transmit the transport layer packet to a first unit of the radio access network, the first unit communicating with a core network.

(Supplementary Note 30)

The communication apparatus according to Supplementary Note 28 or 29, wherein the identification information is an identifier that identifies a cell.

(Supplementary Note 31)

The communication apparatus according to any one of Supplementary Notes 28 to 30, wherein the transport layer packet further includes a radio network temporary identity (RNTI).

(Supplementary Note 32)

A method comprising:

generating a transport layer packet including identification information in a packet region different from a service data unit, the identification information being used in an upper layer of a transport layer; and transmitting the transport layer packet.

(Supplementary Note 33)

A program causing a processor to:

generate a transport layer packet including identification information in a packet region different from a service data unit, the identification information being used in an upper layer of a transport layer; and transmit the transport layer packet.

(Supplementary Note 34)

A non-transitory computer-readable recording medium having recorded thereon a program causing a processor to:

generate a transport layer packet including identification information in a packet region different from a service data unit, the identification information being used in an upper layer of a transport layer; and transmit the transport layer packet.

INDUSTRIAL APPLICABILITY

In a mobile communication system, it is possible to, even when there exist a plurality of apparatuses configured to perform processing of an upper layer of the transport layer for one apparatus configured to perform processing of the transport layer or a lower layer, communication with each of the apparatuses configured to perform the processing of the upper layer, via the transport layer.

REFERENCE SIGNS LIST

1 System
100 Base Station
20 First Type Core Network
21, 51 AP Processing Apparatus
200, 500 IP/SCTP Processing Apparatus
30 Second Type Core Network
300 Control Entity
50 CU
600 DU
700 Communication Apparatus
140, 230, 530, 640 Processing Section
141, 231, 531, 641, 711 Generating Section
143, 233, 533, 643, 713 Transmission Processing Section
145, 235, 535, 645 Reception Processing Section

What is claimed is:

1. A communication apparatus comprising:
a memory storing instructions; and
one or more processors configured to execute the instructions to:
generate a transport layer packet including identification information in a packet region different from a service data unit, the identification information being used in an upper layer of a transport layer; and
transmit the transport layer packet,
wherein the transport layer packet is a stream control transmission protocol (SCTP) packet and includes the identification information outside a header and in a chunk of SCTP,
wherein the header is an SCTP common header,
wherein the communication apparatus is a core network node, and
wherein the one or more processors are configured to transmit the transport layer packet from the core network node to a radio access network node.

2. The communication apparatus according to claim 1, wherein the identification information is used for a user equipment in the upper layer of the transport layer.

3. The communication apparatus according to claim 2, wherein the identification information identifies a connection associated with the user equipment.

4. The communication apparatus according to claim 3, wherein the identification information identifies one connection point of the connection associated with the user equipment.

5. The communication apparatus according to claim 4, wherein the transport layer packet includes first identification information for identifying one connection point of the connection associated with the user equipment and second identification information for identifying another connection point of the connection associated with the user equipment.

6. The communication apparatus according to claim 4, wherein the transport layer packet further includes determination information for determining whether the identification information identifies the one connection point or the another connection point.

7. The communication apparatus according to claim 3, wherein the transport layer packet further includes a path identifier for identifying a path for the connection associated with the user equipment.

8. The communication apparatus according to claim 3, wherein the transport layer packet further includes a user identifier for identifying the user equipment.

9. The communication apparatus according to claim 1, wherein the upper layer is an application layer.

10. The communication apparatus according to claim 1, wherein the identification information is an application protocol identifier.

11. The communication apparatus according to claim 1, wherein the chunk is an SCTP INIT chunk or an SCTP INIT ACK chunk.

12. The communication apparatus according to claim 11, wherein
the chunk includes a region for a variable-length parameter; and
the transport layer packet includes the identification information in the region in the chunk.

13. A method in a core network node, the method comprising:
generating a transport layer packet including identification information in a packet region different from a service data unit, the identification information being used in an upper layer of a transport layer; and
transmitting the transport layer packet from the core network node to a radio access network node,
wherein the transport layer packet is a stream control transmission protocol (SCTP) packet and includes the identification information outside a header and in a chunk of SCTP, and
wherein the header is an SCTP common header.

* * * * *